United States Patent
Krantz et al.

[11] Patent Number: 6,141,737
[45] Date of Patent: Oct. 31, 2000

[54] METHOD FOR DYNAMICALLY AND EFFICIENTLY CACHING OBJECTS RECEIVED FROM AN APPLICATION SERVER BY A CLIENT COMPUTER BY SUBDIVIDING CACHE MEMORY BLOCKS INTO EQUALLY-SIZED SUB-BLOCKS

[75] Inventors: Jeffrey Isaac Krantz, Boca Raton; Marc Alan Bloomfield, Lighthouse Point; Thanh Luu, Sunrise, all of Fla.

[73] Assignee: Citrix Systems, Inc., Ft. Lauderdale, Fla.

[21] Appl. No.: 09/433,679

[22] Filed: Nov. 4, 1999

Related U.S. Application Data

[63] Continuation of application No. 08/541,128, Oct. 11, 1995.

[51] Int. Cl.[7] .................................................. G06F 12/00
[52] U.S. Cl. ........................... 711/171; 711/129; 711/136; 711/203; 711/202; 709/200
[58] Field of Search ..................................... 711/170, 171, 711/172, 173, 118, 129, 3, 202, 203, 133, 136; 707/205; 709/200

[56] References Cited

U.S. PATENT DOCUMENTS

| | | | |
|---|---|---|---|
| 3,596,257 | 7/1971 | Patel | 340/172.5 |
| 4,013,828 | 3/1977 | Judice | 358/133 |

(List continued on next page.)

FOREIGN PATENT DOCUMENTS

| | | |
|---|---|---|
| 0684583A2 | 11/1995 | European Pat. Off. . |
| 0684582A3 | 9/1997 | European Pat. Off. . |
| WO94/03853 | 2/1994 | WIPO . |

OTHER PUBLICATIONS

"The Norton Utilities Version 5.0 Disk Explorer," 1990, pp. 28–54.
"Modern Operating Systems," Andrew S. Tanenbaum, 1992, pp. 74–93.
"The Waite Group's Programming Using Turbo C++," Robert Lafore, 1990, p. 423.
"Patents on Data Compression Algorithms," pp. 1–10, (website) printed out on Jan. 4, 1998.

*Primary Examiner*—Eddie P. Chan
*Assistant Examiner*—Hong Kim
*Attorney, Agent, or Firm*—Testa, Hurwitz & Thibeault, LLP

[57] ABSTRACT

A method for dynamically caching data objects in a logical cache memory begins by organizing the logical cache memory into a set of maximally equally-sized, contiguous pages that begin at a logical cache base address. Any one of the maximal size logical cache pages may be dynamically subdivided into a set of smaller pages of equal size. The smaller size pages cache data objects having a smaller size than the maximum possible data object size. Each subdivided page stores only those smaller size data objects. The logical address for a page is mapped to at least a maximal size page index identifying the position of the maximal size logical page in the cache and, if the page is a smaller size page, the page location is also mapped to a smaller size page index which identifies a particular one of the smaller size pages located within a maximal size page. Pages are dynamically reconfigured based on a least-recently-used policy. A maximal size page may be reconfigured to provide for storage of multiple smaller sized pages and a set of smaller sized pages may be reconfigured to provide storage for a maximal size page. In one aspect, maximally sized pages may be chained together to provide for storage of data objects which exceed the size of the pages. Chained pages may be contiguous or non-contiguous.

23 Claims, 15 Drawing Sheets

U.S. PATENT DOCUMENTS

| | | | |
|---|---|---|---|
| 4,322,795 | 3/1982 | Lange et al. | 364/200 |
| 4,395,754 | 7/1983 | Feissel | 364/200 |
| 4,410,916 | 10/1983 | Pratt et al. | 358/263 |
| 4,430,712 | 2/1984 | Coulson et al. | 364/300 |
| 4,463,424 | 7/1984 | Mattson et al. | 364/300 |
| 4,499,499 | 2/1985 | Brickman et al. | 358/263 |
| 4,503,501 | 3/1985 | Coulson et al. | 364/300 |
| 4,562,423 | 12/1985 | Humblet | 340/347 |
| 4,691,281 | 9/1987 | Furui | 364/200 |
| 4,701,871 | 10/1987 | Sasaki et al. | 364/718 |
| 4,779,189 | 10/1988 | Legvold et al. | 364/200 |
| 4,899,149 | 2/1990 | Kahan | 341/67 |
| 4,905,141 | 2/1990 | Bremza | 364/200 |
| 4,949,281 | 8/1990 | Hillenbrand et al. | 364/518 |
| 4,992,954 | 2/1991 | Takeda et al. | 364/518 |
| 5,103,303 | 4/1992 | Shoji et al. | 358/75 |
| 5,115,479 | 5/1992 | Murayama | 382/56 |
| 5,231,697 | 7/1993 | Yamada | 395/142 |
| 5,233,701 | 8/1993 | Nakata | 395/425 |
| 5,269,003 | 12/1993 | Roskowski et al. | 395/166 |
| 5,309,555 | 5/1994 | Akins et al. | 395/157 |
| 5,339,411 | 8/1994 | Heaton, Jr. | 395/600 |
| 5,351,129 | 9/1994 | Lai | 348/584 |
| 5,357,623 | 10/1994 | Megory-Cohen | 395/425 |
| 5,390,318 | 2/1995 | Ramakrishnan et al. | 395/425 |
| 5,394,531 | 2/1995 | Smith | 395/425 |
| 5,426,752 | 6/1995 | Takahasi et al. | 395/400 |
| 5,434,992 | 7/1995 | Mattson | 395/425 |
| 5,455,576 | 10/1995 | Clark, II et al. | 341/50 |
| 5,473,742 | 12/1995 | Polyakov et al. | 395/142 |
| 5,491,808 | 2/1996 | Geist, Jr. | 395/427 |
| 5,537,551 | 7/1996 | Denenberg et al. | 395/200.18 |
| 5,537,635 | 7/1996 | Douglas | 395/456 |
| 5,561,786 | 10/1996 | Morse | 395/497.01 |
| 5,566,288 | 10/1996 | Koerhsen | 395/142 |
| 5,566,302 | 10/1996 | Khalidi et al. | 709/312 |
| 5,572,206 | 11/1996 | Miller et al. | 341/51 |
| 5,579,507 | 11/1996 | Hosouchi et al. | 395/497.02 |
| 5,588,138 | 12/1996 | Bai et al. | 711/173 |
| 5,651,136 | 7/1997 | Denton et al. | 395/445 |
| 5,652,854 | 7/1997 | Wong | 395/416 |
| 5,717,893 | 2/1998 | Mattson | 395/456 |
| 5,758,085 | 5/1998 | Kouoheris et al. | 709/231 |
| 5,771,034 | 6/1998 | Gibson | 345/141 |
| 5,835,959 | 11/1998 | McCool et al. | 711/171 |

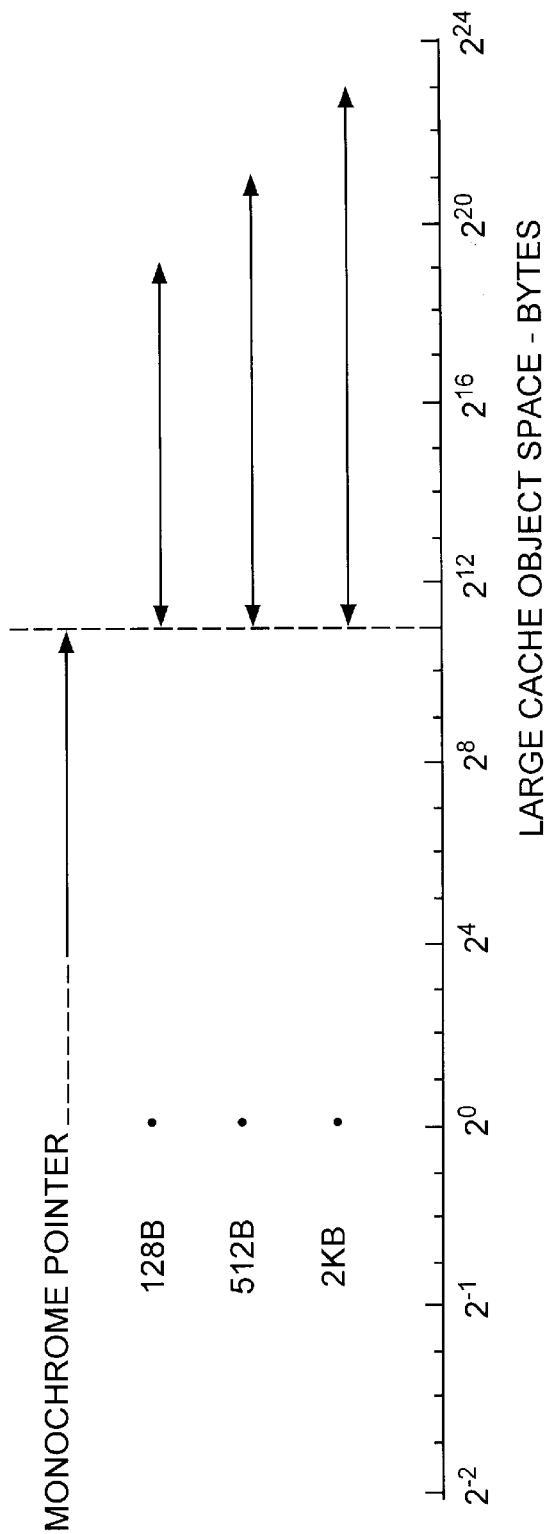

METHOD FOR DYNAMICALLY AND EFFICIENTLY CACHING OBJECTS RECEIVED FROM AN APPLICATION SERVER BY A CLIENT COMPUTER BY SUBDIVIDING CACHE MEMORY BLOCKS INTO EQUALLY-SIZED SUB-BLOCKS

RELATED APPLICATIONS

This application is a continuation of U.S. patent application Ser. No. 08/541,128, filed on Oct. 11, 1995.

FIELD OF INVENTION

The invention relates to efficiently caching graphical user interface (GUI) objects in the memory of a user workstation. The GUI objects are sent from an application server to a user workstation within a distributed process system over a common low bandwidth transport mechanism.

BACKGROUND TO THE INVENTION

Distributed process systems, in which the technique of distributing an application execution is used, are similar to the traditional multi-user systems such as Unix. From a graphics standpoint, the distributed process systems are similar to X-Windows. The technique of distributing an application execution is called Distributed Application Presentation (DAP).

In a DAP system, an application server provides application execution services to network users rather than running the application at the user's workstation. When the application runs, the application server intercepts the application user's interface (e.g., the display screen, keyboard, and mouse) data and transmits/receives this data to/from a small client (user) program running at the user's workstation. More advanced DAP systems operate in a highly integrated network environment in which an application server technology is coupled with local area network (LAN) or wide area network (WAN) transport systems as shown in FIG. 1. The host computer 300 is coupled to LAN/WAN transport system 304. This coupling, that allows the LAN/WAN network administrator to more widely distribute the services of application servers 302 to user workstations 305, requires that the host computer be able to support the simultaneous execution of multiuser applications including support of workstation interfaces such as: keyboard, mouse, and display screen. The most prevalent use of application servers is in dial-in remote access DAP systems.

When running an application on an application server, the user is not actually executing the application code on the user's local workstation. Therefore, in order to make the application server's remoteness transparent, the user workstation storage disks and printers must be accessible by the application server.

The workstation includes the following capabilities:

(1) a protocol for transmission of display screen, keyboard, mouse, file, and printer data;

(2) a layered distribution architecture for transmission of the protocol packets;

(3) a client program that can run on the user workstation for protocol interpretation; and (4) a configuration application for configuring the application distribution protocol stack for accommodating a variety of transport media and client types.

When the workstation is operating as a virtual computer, it is running a client program which transmits and receives Windows-type object level protocol packets. The workstation also handles protocol packets for controlling printing and storage disk operation. If the workstation is a fixed function system, such as an ASCII text terminal, the protocol of the terminal is used.

FIG. 2 shows the major workstation protocol layers of a commercial application server system called "WinFrame ™" manufactured by Citrix Systems, Inc. of Coral Springs, Fla. The WinFrame™ workstation is called "WinStation". The present invention has been implemented in a system of this type and hence the WinFrame™ system will be used as a basis for describing the invention by way of explanation only and not by way of limitation of the scope of the invention.

Referring to FIG. 2, the three major sets of protocol layers are: the WinStation Driver (WD) set 10 acting as the workstation data stream manager that includes ICA, the protocol used for communication of screen, and mouse and keyboard updates, between the application server and the workstation; the protocol driver (PD) set 20 of optional communications protocol layers such as data compression, encryption, reliability (error control), and modem control; and transport drivers 21 for connecting the workstation to the connection (transport) medium.

ICA, a line protocol used to communicate Windows application presentation data with the application server over a low Ad. bandwidth connection, includes protocol definition for the following capabilities:

(1) full-screen text presentation,
(2) Windows application screen presentation,
(3) keyboard and mouse input,
(4) session control,
(5) framing of data for asynchronous connections,
(6) error detection and recovery,
(7) compression and encryption hooks,
(8) file system redirection,
(9) print redirection, and
(10) multiple generic virtual channels.

ICA uses packet communication techniques for communications between the application server and the workstation. The packet, shown in FIG. 3, can be prefixed by optional preambles, negotiated when a connection is established, for managing the transmission of the packet. The nature of the transmission medium (e.g., LAN or Async) and user defined options (e.g., compression, encryption) determine the total packet definition, but the overall packet format is as shown in FIG. 3. The labeled segments are defined as follows:

Frame Head—optional preamble protocol header for framing stream oriented transport data;

Reliable—optional preamble protocol header in packet for transmission error detection and correction;

Encrypt—optional preamble protocol header for managing encrypted data;

Compress—optional preamble protocol header for managing compressed data;

COMMAND—ICA command byte marking the beginning of the base ICA protocol packet;

COMMAND DATA—optional data bytes associated with the specified COMMAND segment that can include virtual channel protocol packets; and Frame Trail—optional protocol trailer (postamble) for framing ASYNC transport data.

Only the COMMAND byte is always present in the packet. The preambles and postamble are dependent upon the transport used and the initialization negotiations.

The ICA COMMANDS include control commands and virtual channel commands.

The ICA control COMMAND packets manage the connection of the workstation to the application server and the server relationship to workstation interface. The COMMAND packets include information on:

(1) connection initialization;
(2) workstation (client) interface and display screen control;
(3) workstation keyboard and mouse input to the application server; and
(4) workstation keyboard light emitting diode (LED) display control.

The ICA virtual channel COMMAND packets provide multiplexed management of multiple virtual channels. A virtual channel is used to add functional enhancements to the client independent of the ICA protocol. The virtual channel is a session-oriented transmission connection that can be used by the application layer code. The ICA virtual channel COMMAND protocols include: Thinwire, Printer Mapping, and Drive Mapping.

Thinwire—is used to transmit presentation commands to the client workstation from Windows applications running on the application server. It is designed to use low bandwidth connections between the server and the workstation by using such techniques as:

(1) command and object specific compression;
(2) outboard complex clipping and complex curve drawing;
(3) efficient caching of Windows objects (bitmaps, brushes, glyphs, and pointers); and
(4) run-length encoding.

Printer Mapping—is a virtual channel protocol for the transmission of printer data to the client workstation.

Drive Mapping—is a virtual channel protocol for the transmission of file system functions between the application server and the client workstation.

FIG. 4 shows the Citrix Systems WinStation 100 and WinFrame™ Application Server 200 Communications Stack architecture as a set of component definitions. WinStation 100 is a system component capable of displaying application data and transmitting application input data to the server. The WinStation assumes many forms such as a simple text terminal, a personal computer (PC) emulating a terminal, or a PC running a program (or terminal) that implements the ICA protocol. The functionality of the WinStations and the method of communicating with the server may differ but the architecture shown in FIG. 4 accommodates these differences.

The architecture of FIG. 4 is defined in terms of the protocol layers and their specific responsibilities. At the top of both Application server 200 and WinStation 100 are the respective data sources 210 and 110. In the case of unit 110, a display screen, keyboard, and mouse are shown and function as both a data destination and data source. As previously mentioned, the WinStation 100 may take on a variety of configurations depending on the user needs. The protocol layers are defined as follows.

WinStation Driver (WD) 10 is responsible for interpreting the data stream generated by the WinStation or Application Server. The WD is tailored to each WinStation: it is different for each type of workstation (e.g. a dumb terminal or an ICA terminal).

Protocol Driver (PD) 20 is a communications layer added to the protocol stack for preparing the data to be transmitted to the corresponding WinStation or Application Server. Because all PDs support the same interfaces, each PD can be inserted or removed from the stack in accordance with the needs of each connection. The order in which the PDs are stacked is controlled by the configuration process.

Transport Driver (TD) is a PD for interfacing the stack to the system provided transport service 300 and is tailored to the type of transport service being used by each WinStation.

Protocol Advertiser (PA) 50 is used by each Application Server for broadcasting that a particular Application Server is on-line and functioning. In this way, a WinStation, using the same transport service, may be made aware its availability.

Protocol Listener (PL) 40 provides an Application Server with the capability to listen for connection requests from WinStations.

Name Resolver (NR) 30 is unique to the type of network to which the WinStation is connected, provides network name-to-address translation.

Name Enumerator (NE) 31 is unique to the type of network to which the WinStation is connected and provides enumeration of all on-line Application Servers on the network.

Virtual Driver (VD) 60 is for running the virtual channel protocols as defined in the ICA. The VD supports a generic set of interfaces that are accessible through system Application Protocol Interfaces (APIs) and communicates with the WD through a special interface.

The Application Server 200 of FIG. 4 includes a Win 32 Subsystem 210 for the management of an associated client WinStation for which application services are to be provided. As shown in FIG. 5, subsystem 210 includes the Client Server Runtime Subsystem (CSRSS.EXE) Process 230 and Protocol Service Process 240. Process (CSRSS.EXE) 230 controls WinStation Driver Stack 220, a dynamic linkable library (DLL) of protocols, through WinCon Server 231 by creating the control datastream needed to control the WinStation being accessed. WinCon Server 231 contains all the console (text window) code and APIs. WD Stack 220 includes WD 10, PDs 20, and TD 21, each of which is a DLL driver.

ThinWire Driver 60 is controlled by Graphical Device Interface (GDI) Server 233 and User Server (USER) 232. GDI Server 233 is the graphics portion of the Win32 subsystem that contains all of the graphics code and APIs. USER 232 is the non-graphics portion of the Win32 subsystem that contains the remaining APIs not contained in WinCon Server 231 or GDI 233.

Protocol Service Process 240, controls PL 40 and PA 50 for effecting a connection between the Application Server and the WinStation requiring service. A PL 40 and PA 50 pair is provided for each type of transport that is supported by the system. The PA 50 broadcasts the Application Server's availability on a network while the PL 40 listens for service requests from WinStations on a network.

The WD interface of WD Stack 220 provides WinCon Server 231 with display function information, display mode control, and session connect/ disconnect information for handling full screen text transmission and WinStation initialization. Keyboard and mouse input is delivered to WinCon Server 231 through the WD interfaces. Each WD maintains a FIFO (first-in, first-out) queue for mouse and keyboard input events. A raw input thread (RIT) in process CSRSS takes its input events from this queue.

The WD Stack 220 is defined by a configuration utility named WINCFG. When a WD is defined or when the Win32 Subsystem is started, the DLLs are loaded. FIG. 6 shows the Win32 Subsystem stack components. The PD 20 and TD 21 components are as previously described. The WinStation Drivers (WDs) include: ASCII terminal WD for terminals like the DEC VT420 from Digital Equipment Corp. and the Citrix ICA 3.0 WD.

ICA WinStation, a DOS (disc operating system) program for connecting to and communicating with the Application Server using the ICA protocol, is modular and can be dynamically configured and customized with different user interfaces and optional virtual channel capabilities. FIG. 7 is a graphical representation of ICA WinStation 110 that shows ICA WinStation 110 as an executable (.EXE) DOS program that includes User Interface (UI) 111 and Libraries (.LIB) 112 operating on an assortment of DLLs that are run-time loaded and linked. The Libraries can be linked with the User Interface and DLLs to provide system independent interfaces and ease in porting to non-DOS platforms.

UI 111 is the master controller of the ICC WinStation and has responsibility for:

(1) establishing and maintaining configuration data;
(2) loading required protocol components;
(3) running a polling loop; and
(4) presenting a local user interface.

In order to make a connection to a specific- application server, UI 111 maintains configuration information for the connection that includes any name-to-address translation data and a list of protocol stack components (PDs and TD) and protocol parameters required. When an Application Server is selected by the user, the UI loads the appropriate stack components and passes the user selected parameters to the Application Server based upon the configuration data. Configuration Libraries (CFGs), based on Initialization (.INI) files, are used to simplify-the loading and linking process. The connection process is initiated by a UI call to the ICA WD 10 at the top of the stack with a connection initiation command. The connection process is asynchronous. UI 111 starts its polling loop by keying off the connection status that is returned. Once the connection status is established, UI gives up focus (i.e. ownership of the keyboard, mouse, and display screen) to the WD. The UI remains the master and continues to run the polling loop. WD gives up focus when the connection is broken.

While a connection exists, UI 111 can query statistics and error conditions and, can also terminate the connection. If a connection is broken, UI 111 is responsible for cleaning-up is by unloading all of the stack components.

There are four .INI files associated with UI 111:

(1) MODULE.INI that lists the protocol-stack components;
(2) APPSRV.INI that describes the application server configuration;
(3) MODEM.INI that describes the modem management strings; and
(4) WFCLIENT.INI that lists the user configurations.

Winstation Libraries 112, a set of run-time libraries that simplify customization of components, includes:

(1) clib, a C-language run-time library subset;
(2) cfg, libraries for configuration and standard operations such as loading and linking;
(3) ini, functions for access of INI style parameters;
(4) video, keyboard, mouse, timer, and parallel port libraries for access to these hardware components;
(5) xms, extended memory allocation libraries; and
(6) logging, functions for standard logging and tracing facilities.

These libraries are directly linked to by the UI EXE and are accessible to the DLLs indirectly through the DLL interface process.

ICA WD 10, when it has focus, controls the presentation of a specific WinStation protocol on the local screen display and also manages the communication of the keyboard and mouse inputs to the Application Server. Focus is given to ICA WD 10 by UI 111, as previously described.

ICA WD 10 gets its protocol packets from the topmost PD on PD stack 20. When ICA WD 10 links with this PD, it registers an input processing entry point. This entry point is called when a data packet is available. When ICA WD 10 needs to write data, it calls the PD using a PD write function.

ICA WD 10 also responds to the polling function of UI 111 and passes it on to lower stack layers. State data is reported by this method so that, for example, if a lower layer detects that a connection is broken, this status information is passed up to UI 111 through the return codes of the polling functions.

ICA WD 10 also provides a general purpose virtual channel capability represented by the set of virtual channel drivers (VDs) 60 described below.

ICA WD 10 provides a set of Application Program Interfaces (APIS) that includes:

(a) Load ( ) for loading and linking a driver into the protocol stack;
(b) WdUnload( ) for unlinking and unloading a driver from the protocol stack;
(c) WdOpen for opening and initializing a driver;
(d) WdClose for closing a driver;
(e) WdInfo for querying driver information;
(f) WdPoll for getting status and giving control to drivers in the protocol stack;
(g) WdQueryInformation for querying modem status, mouse information, last error, and statistics; and
(h) WdSetInformation for connecting, disconnecting, setting or killing a focus.

All protocol drivers (PDS) 20 have the same interfaces and are dynamically loaded and linked in the same manner by UI 111. Also, a PD may be added or removed from the configuration without changing the underlying code.

Because of some interdependencies, PDs 20 must be loaded in a specific order, e.g. the Compression PD requires the framed packet of the framing PD.

The WinStation includes the following optional PDs:

(a) a Compression PD for compressing and decompressing of raw data;
(b) a Reliable PD for error handling for unreliable transport such as IPX and Async;
(c) a Framing PD for framing of stream type data from Async and TCP transport services into packets;
(d) a Modem PD for managing the establishment of a modem connection; and
(e) an Encryption PD for encrypting data.

The WDs and PDs each provide a set of Application Program Interfaces (APIs) that includes:

(a) Load ( ) for loading and linking a driver into the protocol stack;
(b) WdUnload( )/PDUnload( ) for unlinking and unloading a driver from the protocol stack;
(c) WdOpen/PdOpen for opening and initializing a driver;
(d) WdClose/PdClose for closing a driver;
(e) WdInfo/PdInfo for querying driver information;
(f) WdPoll/PdPoll for getting status and giving control to drivers in the protocol stack;

(g) PdWrite for writing data;

(h) WdQueryInformation/PdQueryInformation for querying modem status, mouse information, last error, or statistics;

(i) WdSetInformation/PdSetInformation for connecting, disconnecting, setting and killing focus.

The Transport Drivers (TDs) are similar to the PDs, i.e. the top interfaces are the same and TD loading, linking, and polling are done in the same way. The TDs differ from the PDs because the bottom interface of each is for a specific transport service. For example, the DOS IPX TD is programmed for the Novell IPX DOS INT for reading and writing packets over the underlying IPX network.

The WinStation client includes the following TDs 20:

(a) an IPX (Internet Packet Exchange) TD is a NetWare LAM communication protocol for moving data between server and/or workstation programs running on different network nodes;

(b) an SPX (Sequenced Packet Exchange) TD is an enhanced set of commands implemented on top of IPX for creating a true transport layer interface;

(c) a TCP/IP (Transmission Control Protocol) TD is an Internet protocol suite providing reliable, full duplex, stream service.

(d) a NetBIOS (Network Basic Input/Output System) TD is an application programming interface for data exchange between a server and/or workstation programs running on different network nodes; and (e) an Async TD is the standard interface to an RS-232 type asynchronous transport service.

The TD APIs are similar to those listed for the PDs/WDs above.

Name Resolver (NR) 30 is a DLL module for providing network name-to-address translation of a selected application server to UI Ill of FIG. 7. NR 30 specific APIs include: Load( ), NrUnload( ), NrOpen( ), NrClose( ), NrInfo( ), NrPoll( ), NrName ToAddress( ), and NrErrorLookup( ).

Name Enumerator (NE) 31 of FIG. 7 is a DLL module for enumerating all available application servers on the network. NE 31 specific APIs include: Load( ), NeUnload( ), NeOpen( ), NeClose( ), NeInfo( ), NePoll( ), and NeEnumerate( ).

Virtual Channel Driver (VD) set 60 are directly connected to ICA WD to allow application level communication to be multiplexed with the display protocol. The set of VDs support the following functions:

(a) client printer mapping for allowing a printer device on the Application Server to be redirected to a printer on the client computer;

(b) client drive mapping for redirecting drive letters on the Application Server to drive letters that exist on the client computer; and (c) Thinwire presentation protocol for operating the WD protocol as a virtual channel.

VD set 60 includes the following APIs: Loado, VdUnload, VdOpen, VdClose( ), VdInfo( ), VdPoll( ), VdQueryInformation, and VdSetInformation( ).

Scripting 32 (FIG. 7) is an optional DLL that is an extension of UI 111 for prerecording keystrokes and responses to display screen output for automating some user operations.

Because the application server and the user workstation are generally physically separated and are only linked by a transport mechanism for communications that is of lower bandwidth than that required to directly support the workstation display if it were part of the application server's host system, it is highly desirable to have an efficient method to send graphical data and control messages from the application server to the workstation. This objective has been traditionally achieved by using bandwidth compression techniques for more efficient use of the common transport system.

The use of bandwidth compression techniques for the transmission does not, per se, remove the need to recreate the original data (and bandwidth) required for driving the workstation display. The original bandwidth requirement obtains after the reduced bandwidth encoded message is expanded to the original form required to drive the workstation display. For example, the graphical data could be encoded by using a code book in which each complex graphical object is represented by a simpler numerical code. Upon receipt of the coded graphical data, each numerical code would be decoded at the workstation by entering a copy of the code book using an address corresponding to the numerical code and retrieving the corresponding complex graphical instruction. This implies the need for a large fast cache memory with sufficient bandwidth to support the workstation graphics.

The ability to effectively and efficiently cache graphical user interface (GUI) objects such as bitmaps, glyphs, pointer images, and brushes is essential for enabling the user to perceive a responsive and well performing GUI application at the workstation even though the GUI application code is executing remotely.

Because the workstation cache capacity is potentially limited, it is important that GUI objects of different types and sizes be able to efficiently share cache memory in the workstation. Prior art caching methods for GUI objects preassigned separate fixed size memory areas for each object type and for each size. Consequently, the cache resources cannot be dynamically assigned or reassigned between different object types and between different size groups within the same object type. This leads to the following limitations in the prior art:

(1) the workstation is unable to initialize and establish a connection with the application server if the fixed memory size areas required by the workstation are not available for caching;

(2) if the exact fixed size memory area required for a specific object type and size is not available for caching, even if a smaller size memory is available, the workstation is unable to use the smaller memory area and will not cache any objects of that type and size;

(3) if a user has heavy usage of one object type and is not using any other object type, the unused cache area is not available for caching the object type that is being used.

Additional prior art limitations include;

(a) the specific cache area assigned for storing each specific workstation GUI object type must be contiguous; and (b) the number of object types and sizes is limited so that the application server's servicing is further restricted.

SUMMARY OF THE INVENTION

The present invention solves the prior art problems by providing a method for efficiently caching GUI objects in a workstation cache memory by maximizing the use of available cache memory to store the GUI objects and thereby reducing the bandwidth requirements for the common transport mechanism used for communications between the application server and the client workstation in a distributed process system.

The GUI caching method and system includes the following features:

(a) each workstation has a set of selectable cache memory pages of differing sizes for storing GUI objects of differing page sizes, each page being directly accessible for reading or writing;

(b) cache memory pages of different sizes dynamically share the same logical cache address space for optimal use of available cache memory based on object usage patterns;

(c) each cache memory page is capable of being chained with any other page for writing and reading a logical sequence of cache memory pages; and (d) chained cache memory pages can be read by using a single memory address to the first cache memory page of the chained cached memory pages.

BRIEF DESCRIPTION OF THE DRAWINGS

The present invention may be more fully understood from the detailed description given below and from the accompanying drawings of the preferred embodiments of the invention, which, however, should not be taken to limit the invention to the specific embodiment but are only for explanation and understanding.

FIG. 10 is a table showing different chunk types and cache memory allocations.

FIG. 11 is a memory allocation map for a GUI object large cache memory.

DETAILED DESCRIPTION OF THE INVENTION

The available bandwidth of the common transport mechanism in a distributed process system is generally small compared to the bandwidth required to feed a workstation display screen in support of an application that is executing at a remote application server but is displaying results on the workstation display screen. The effective bandwidth at the display has to be sufficient to support the illusion that the application is executing locally without the constraints imposed by the restrictive bandwidth of the transport mechanism.

Because the caching space in the workstation is potentially limited, it is necessary that all available cache capacity be used efficiently. This requirement .implies the following considerations:

(a) memory space available for caching may not be contiguous;

(b) cache memory space must appear as a single logical cache area even if the memory resources are a heterogenous collection of non-contiguous memory spaces with different operating characteristics;

(c) available cache memory must accommodate a large variety of GUI objects of differing types and sizes;

(d) each GUI object stored in cache must be read-accessible by a single handle regardless of size; and (e) available cache space must be dynamically adaptable to accommodate the GUI object usage of the applications currently using the workstation display.

The cache protocol recognizes two different logical cache areas labeled the "tiny cache" and the "large cache". The size of the tiny cache can be 0 to 32K bytes in 32 byte increments. However, a size of less than 8K bytes is not recommended for the tiny cache. The size of the large cache can be 0 to 8M bytes in 2K byte increments.

Each logical cache area has a contiguous range of logical (versus physical) addresses used to store one or more "chunk types". A chunk type identifies the size of the object for data being stored in the cache area.

Figure 1:
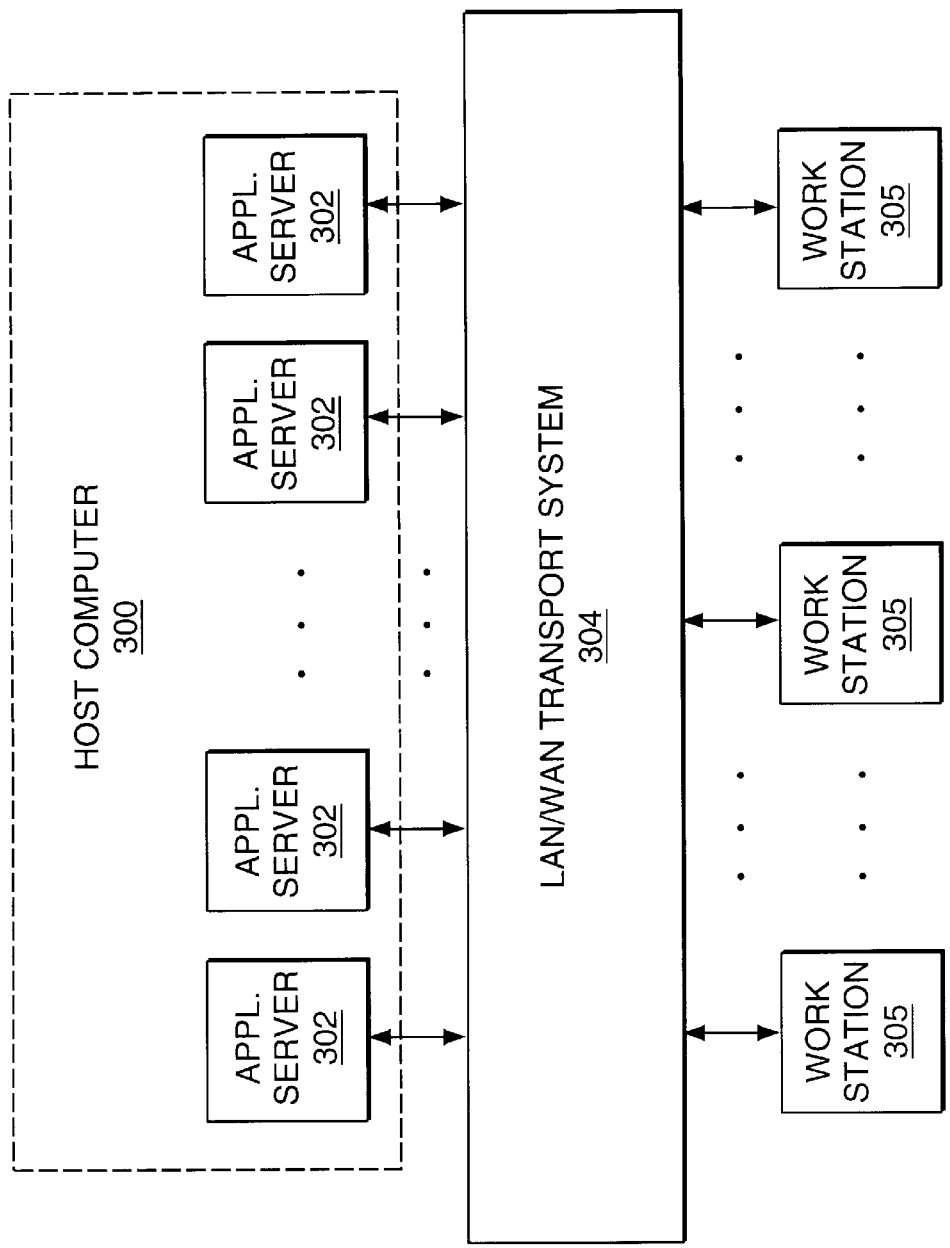
FIG. 1 shows a distributed application presentation system.
Figure 2:
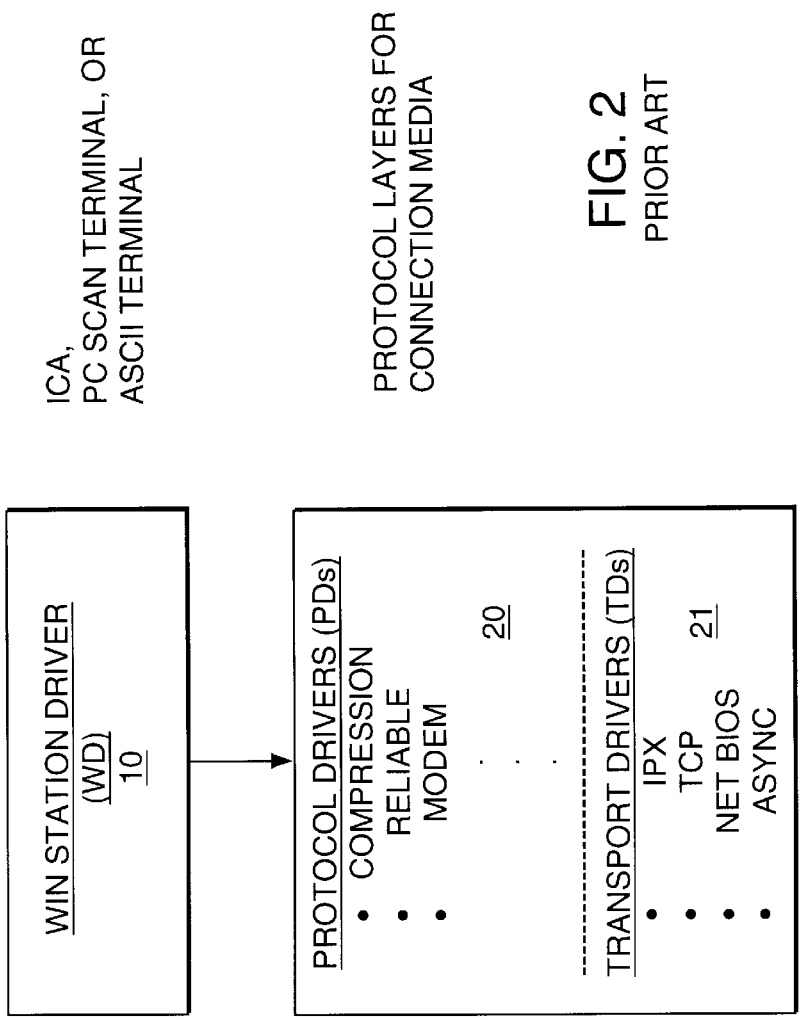
FIG. 2 shows the major workstation protocol layers of a distributed process application server system.
Figure 3:
FIG. 3 shows a communication packet format used in the distributed process system.
Figure 4:
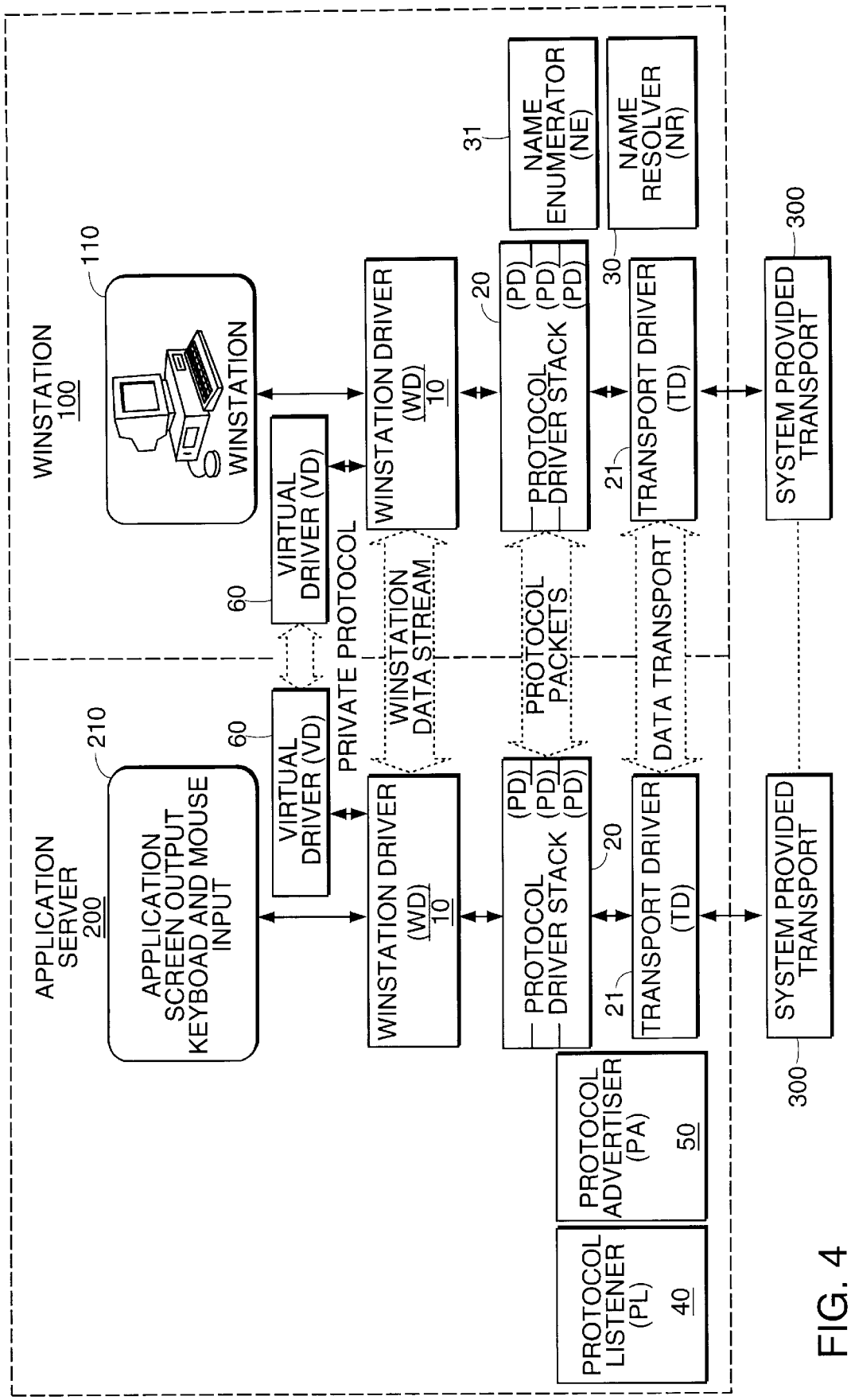
FIG. 4 shows the communication stack architecture of a commercial distributed process application server system.
Figure 5:
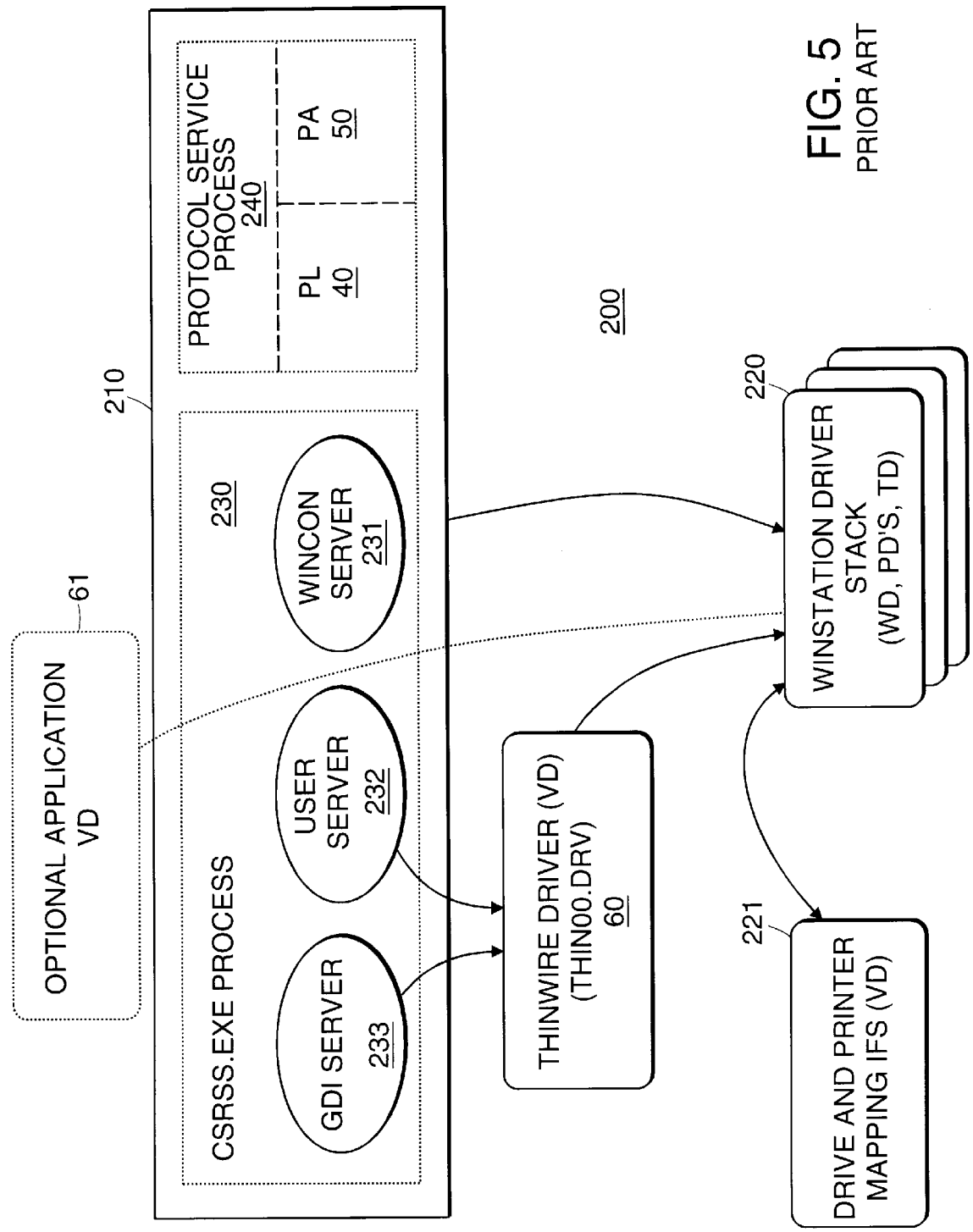
FIG. 5 shows the processes of the application server.
Figure 6:
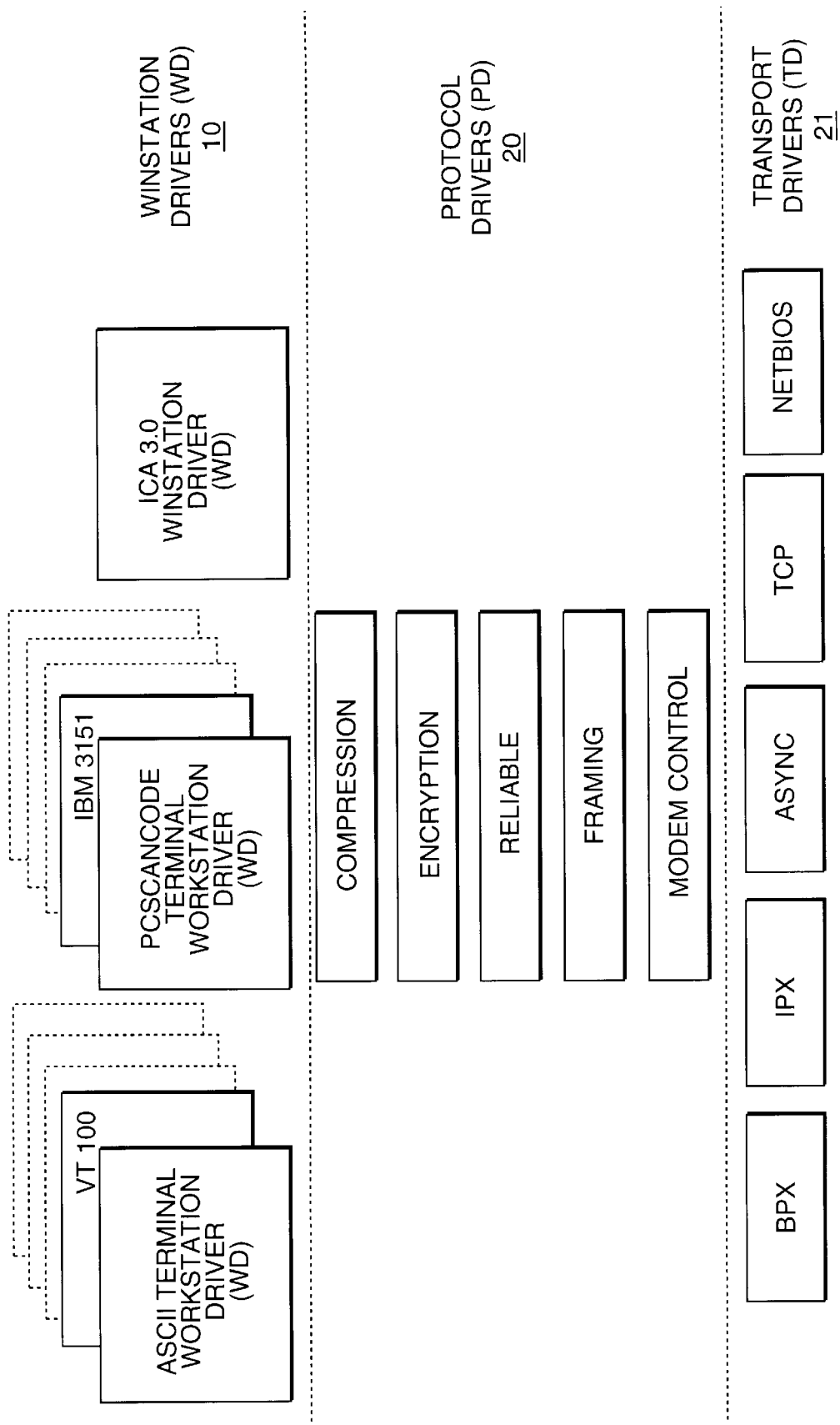
FIG. 6 shows the application server protocol stack architecture components.
Figure 7:
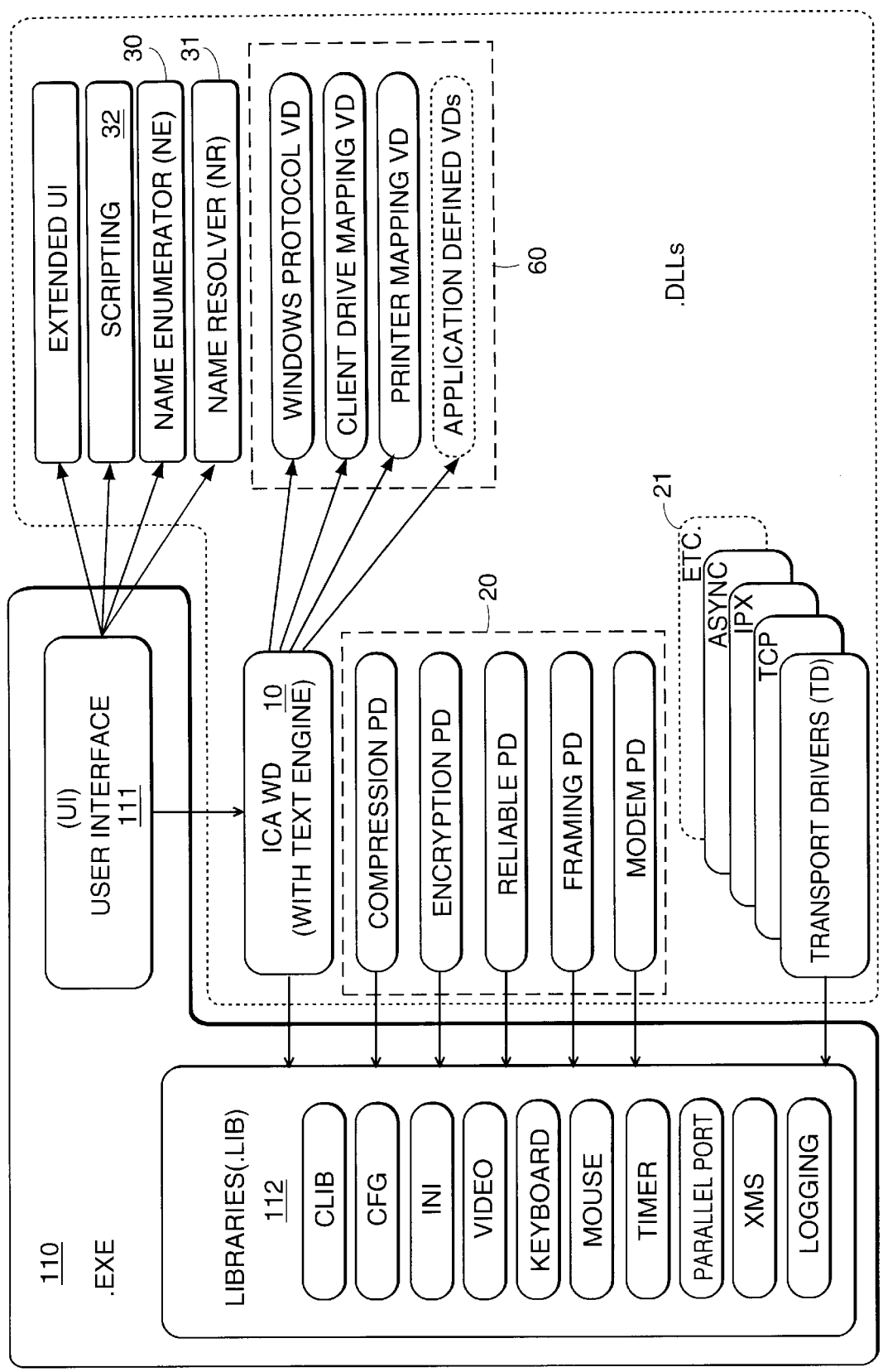
FIG. 7 is an architectural representation of an ICA type workstation.
Figure 8:
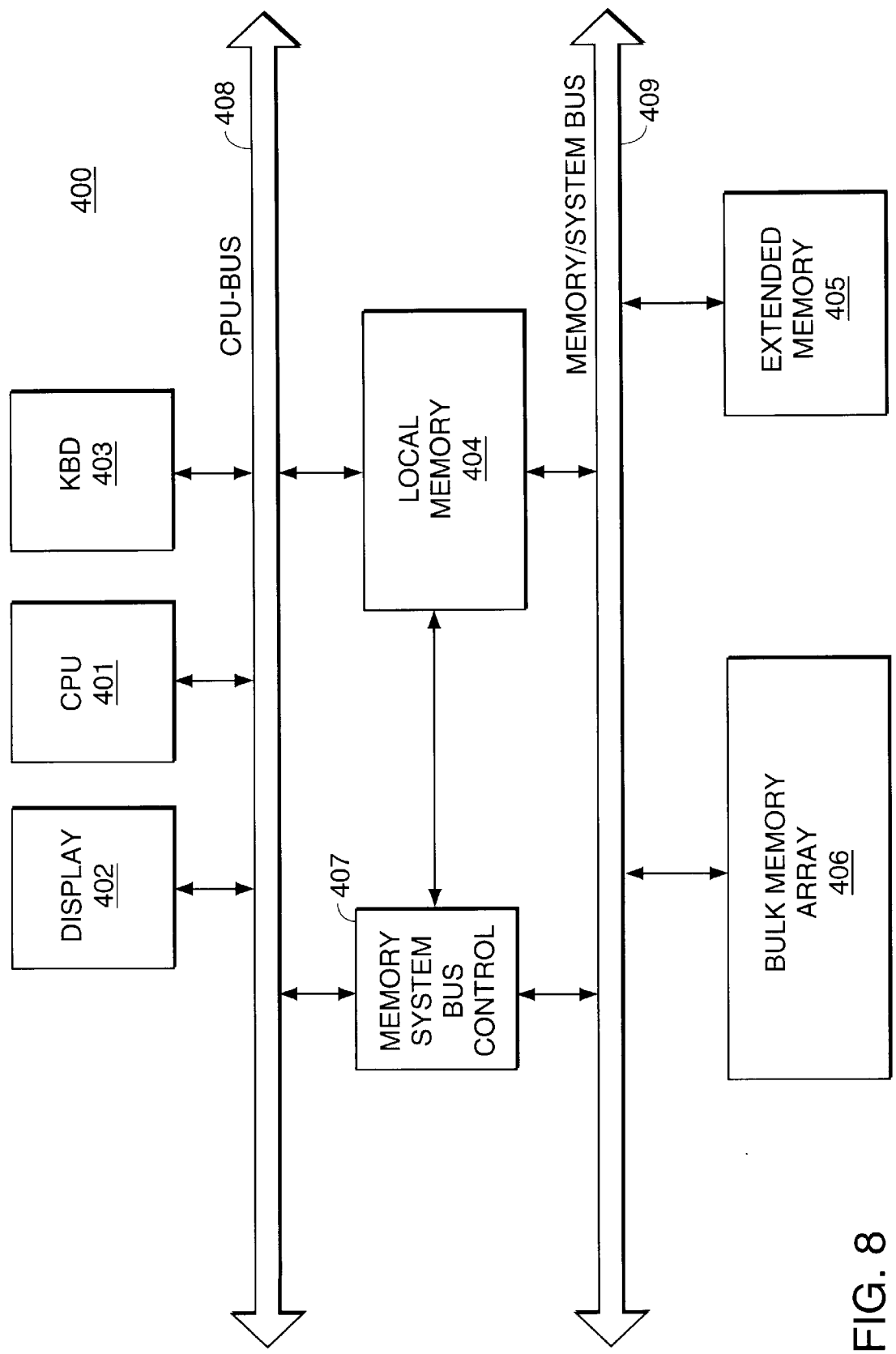
FIG. 8 is a block diagram of a workstation showing the physical memories.

FIG. 8 shows a workstation 400 in which three different types of physical memory are used: local memory 404, fast and directly accessible to the CPU; extended memory 405, moderate speed and accessible to the CPU by the memory bus; and bulk memory array 406, slow mechanical disk drive arrays. CPU bus 408 interconnects CPU 401, display 402, keyboard 403, local memory 404, and memory/system bus control 407. Fast local memory 404 and memory/system bus control 407 are also connected to memory/system bus 409 for providing CPU 401 access to extended memory 405 and bulk memory array 406.

Figure 9:
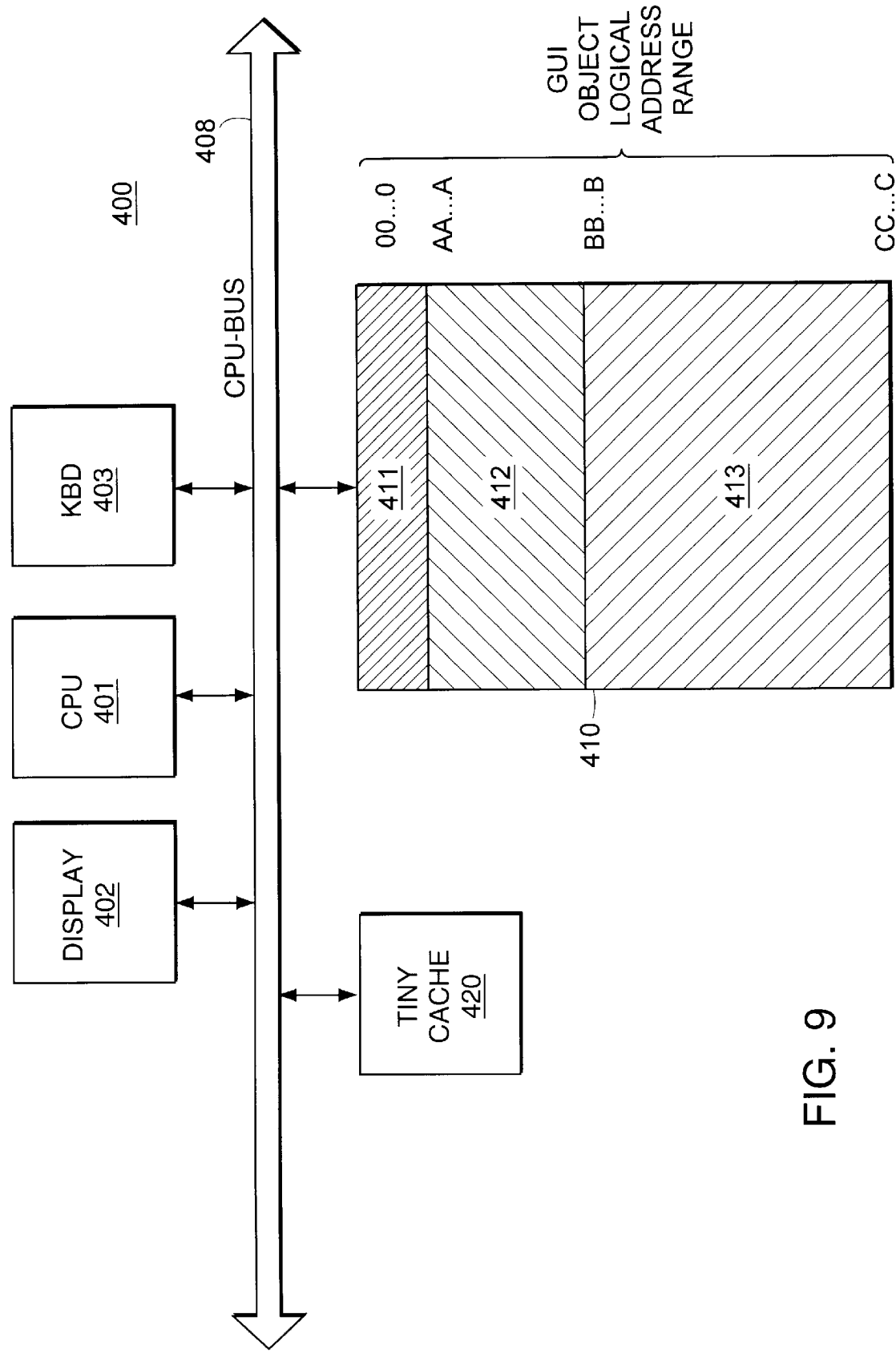
FIG. 9 shows a workstation logical GUI object tiny cache and large cache.

The GUI object cache memory that has one or more contiguous logical segments can use all or some of these physical memories. Also, there may be multiple logical segments using the same physical memory type. Physical memories are prioritized by bandwidth so that a performance optimizing memory allocation for GUI object cache is made by choosing the higher bandwidth memories first and allocating the slower memories only when faster memory capacity is exceeded. FIG. 9 shows workstation 400 in which the a logical large GUI object cache 410 has been created that includes three logically contiguous segments (411, 412, and 413) that are physically portions of memories 404, 405, and 406 of FIG. 8, respectively. The logical addresses begin with 00 . . . 0 at the lower end of GUI object cache 410 and increment in 2KB page steps through memories 411–413. Tiny cache 420 is also a logical memory structure preferably created as part of local memory 404.

A given protocol packet addressing cache 410 or 420 contains a "client object cache handle" and a chunk type. The chunk type determines the size of the object and, together with the client object handle, determines the offset into the appropriate logical cache area. The sizes of the two cache areas are determined by the client and the sizes are reported as parameters by the client workstation to the application server during the connection procedure.

The tiny cache is used exclusively for storing objects of chunk type 32B that are <32 bytes in size. The client object cache handle for a chunk type 32B is 10 bits long so that 1024 different 32 byte size areas can be accommodated in the tiny cache. If the tiny cache is smaller than 32K bytes then the application server will not generate handles for access to addresses outside the range of the specified tiny cache size. If the tiny cache resides solely within the directly addressable memory of 1K bytes, 5 bits of the object cache handle can be used to specify the offset into the area of tiny cache 420 of FIG. 9.

The large cache 410 (FIG. 9) is used for objects with many different chunk types. All of the varied chunk type objects share the same contiguous set of logical addresses. The application server is responsible for maintaining cache consistency as different size objects share the large cache.

The chunk type of a given object is used together with the client object cache handle to determine the logical address (offset) into the large cache. The client object cache handle contains the object number (starting with 0) for the corresponding object size. The object offset into the large cache is computed by multiplying the size of the object by the client object cache handle. The offset is added to the start of the large cache independent of-the chunk type (size). Because the client object cache handle is specified by a field of 12 bits ($2^{12}$=4096), the larger chunk types can extend deeper into the large cache, i.e. beyond the offsets of the smaller size chunk types.

FIG. 10 is a table showing the chunk types that share the large cache. The columns are organized as follows: the first lists the chunk type (monochrome pointer, 128B, 512B, 2KB); the second lists the corresponding sizes in bytes; the third lists the corresponding maximum number of objects and the number of bits required parenthetically; and the fourth lists the total cache space in bytes that can be occupied.

FIG. 11 is a memory map showing the regions of large cache address space that can be used for each chunk type listed in FIG. 10. The top to bottom order of lines, that shows the allowable region for storage, corresponds to the order of chunk types listed in FIG. 10: monochrome pointer, 128B, 512B, and 2KB. The regions in which the lines overlap demonstrate the concept of different chunk types sharing common regions of large cache.

In order to simplify the implementation, the first 2K of the large cache of FIG. 11 is only used to store the monochrome pointer chunk type of objects. The rest of the large cache is shared between chunk types 128B, 512B, and 2KB. The way in which this sharing is done is as follows: a single 2K byte area (or maximal page) in the large cache that starts on a 2K byte logical address boundary can be assigned to hold objects of the same chunk type at a given time. Thus, a 2K byte area can be assigned to store objects of the same chunk type (or page size), i.e. a single 2KB chunk type object, 4 different 512B chunk type objects, or 16 different 128B chunk type objects.

The usage of each 2K address range in the large cache can change as each 2K area is re-used. At a given time, it can store a single 2KB chunk type object, and at another time it can store up to 4 512B or 16 128B chunk type objects. For simplicity in cache management, a given 2K address range is not used to store a mixture of 128B and 512B chunk type objects. Also, because the lower 2K bytes of large cache are reserved for monochrome pointer type objects (FIG. 11), the client object cache handle has a minimum values of 1, 4 and 16 for chunk type objects 2KB, 512B, and 128B respectively.

Figure 12:
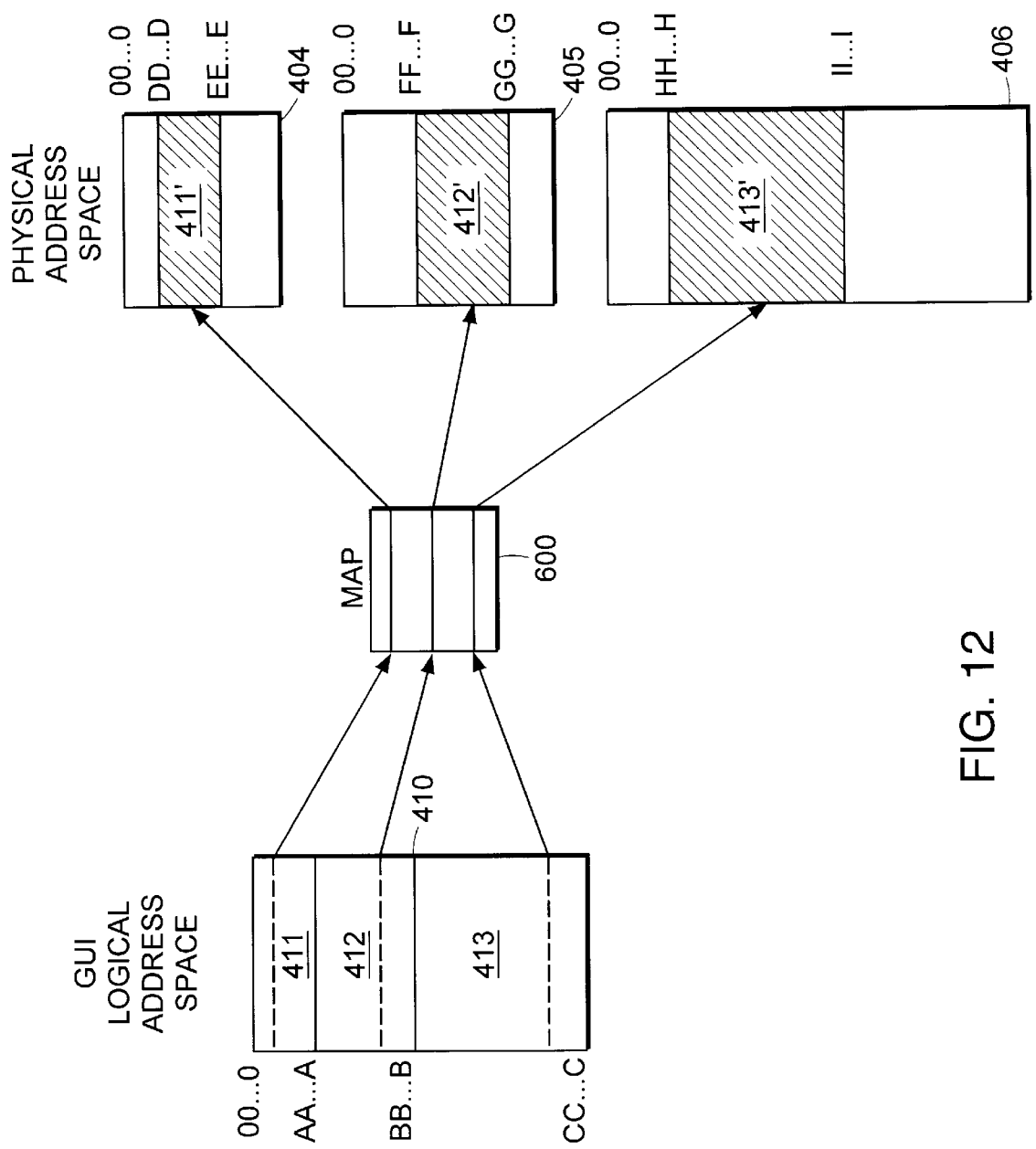
FIG. 12 shows the mapping process between a GUI large cache logical address space and a physical address space.

In order to relate a logical address of the large GUI cache to a physical address in a memory unit (e.g. 404, 405, or 406 of FIG. 8), a memory address mapping process, such as that shown in FIG. 12, is used by CPU 401 (FIG. 8). The application server specifies a GUI object by sending a corresponding client object cache handle and chunk type to the workstation in a virtual channel protocol packet. This logical address corresponds to the desired GUI object in GUI cache memory 410, as shown in FIG. 9. Referring to FIGS. 8, 9, and 12, mapping process (MAP) 600 determines which physical memory unit (404–406) corresponds to the given logical address. It should be recalled that the logical cache memory 410 is organized from several heterogenous physical memories arranged in hierarchical order of speed. Thus, local memory 404 provides storage for cache addresses 00 . . . 0 up to (but not including) AA . . . A, shown as logical cache memory section 411. MAP 600 identifies any address in this range as belonging to physical memory unit 404 and corresponds to a stored entry in segment 411' between address DD . . . D and address EE . . . E. The data location in memory unit 404 is determined by using the product of the client object cache handle and the GUI object size as an offset from address DD . . . D. Similarly, any logical address $\geq$AA . . . A and <BB . . . B is mapped onto space 412' of memory unit 405. The offset from address AA . . . A, is used to find the offset from address FF . . . F in section 412' of memory unit 405. Similarly, higher order addresses for logical memory addresses from BB . . . B to CC . . . C would be mapped to section 413' of physical memory unit 406. It should be noted that this procedure for mapping logical to physical memory addresses may be applied to GUI caches using one or more physical memory units and, consequently, multiple logical address ranges may map to different portions of physical memory units of the same type.

To help in understanding the dynamic operation of the large cache memory, assume that all 2K byte areas have been allocated for the storage of various chunk types. For purposes of control, the application server maintains a LRU (least recently used) list of all the 2K areas in the large cache. If the application server needs to put a GUI object in the large cache, it determines the GUI object chunk type and then proceeds as follows:

(a) if the GUI object is a 2KB chunk type, then the least recently used 2K area in the large cache is used for caching the GUI object;

(b) if the GUI object is a 512B chunk type, and no free 512B areas exist, the least recently used 2K area that is addressable by a 512B chunk type object (see FIG. 11) is used and is subdivided into 4 512B areas (areas 0–3). Area 0is used to cache the current 512B chunk type and the cache control storage marks area 0 as allocated. This leaves 3 512B unallocated areas. The client object handle is the 2K area number multiplied by 4 plus the 512B area number. Additional 512B chunk type areas are allocated as required, from the remaining 512B areas defined in the current 2K area. Once all 512B areas in a given 2KB area are allocated, a new 2KB area is selected using the LRU rule described; and (c) if a 128B chunk type object is to be cached, the procedure is the same except that the LRU rule selected 2KB area is subdivided into 16 128B areas. The client object cache handle is obtained by multiplying the 2K area number by 16 and then adding the 128B area number to the product. FIG. 11 shows that fewer 2K areas are addressable for caching the 128B chunk types than for the 512B chunk types. Different chunk type objects do not intermix in a given 2KB area.

In this manner, client object cache handles are assigned independent of the order of arrival of the various chunk type objects. The cache is dynamically adapted to the caching requirements of a given application by assigning cache resources to the application as needed.

Figure 13:
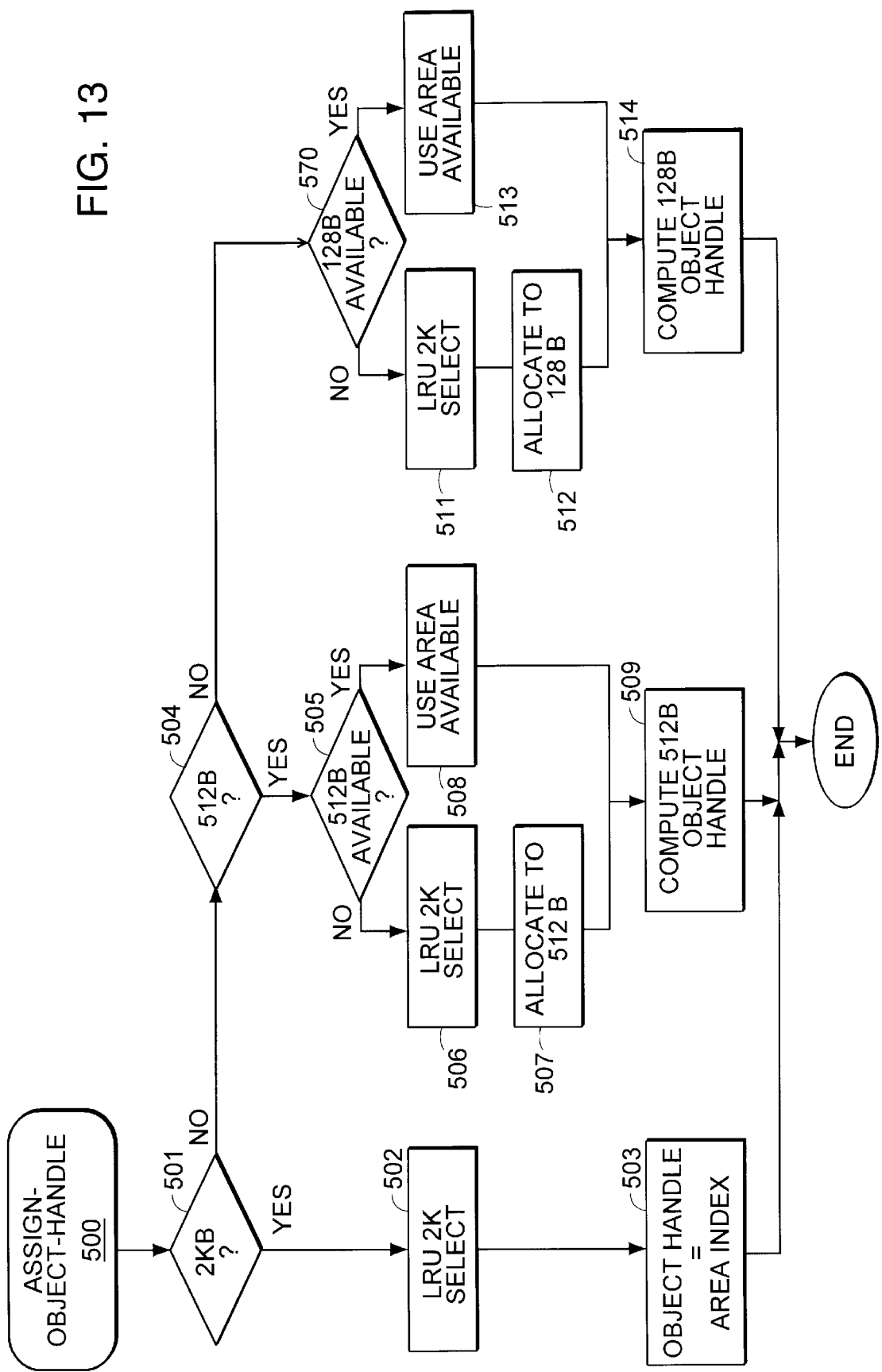
FIG. 13 is a flow diagram for assigning GUI object handles.

FIG. 13 is a flow diagram for process 500, named ASSIGN__—OBJECT_HANDLE, that assigns GUI object handles for large cache 410 (FIG. 12). The method checks if the GUI object to be cached is of chunk type 2KB in step 501. If it is, step 502 uses the LRU rule to select a 2K area in the cache region not allocated to monochrome pointers (FIG. 11). Having selected a 2K area (slot), step 503 computes the client object cache handle by setting it equal to the 2K slot number selected by the LRU rule and the procedure ends. If step 501 determines that the GUI object is not chunk type 2KB, step 504 determines if the GUI object is of chunk type 512B and, if so, proceeds to step 505 to determine if a size 512B area (slot) is available. If not, step 506 uses the LRU rule to select the least recently used 2K slot from the contiguous set of 2K slot available for caching 512B chunk type objects. Step 507, allocates the selected 2K slot for use for caching 512B chunk type objects and assigns the lowest order 512B slot (0) to the current GUI object that is to be cached. Otherwise, if a 512B slot is available, step 508 stores the GUI object in the next 512B slot available in the 2KB slot currently allocated for 512B chunk type object storage. At step 509, the client object handle is calculated by multiplying the 2K slot number by 4 and then adding the 512B slot number to that product. If step 504 determines that the GUI object is of chunk type 128B (by not being chunk type 512B), step 510 checks if a 128B slot is available, and, if not, proceeds to step 511 where the LRU rule is used to select a suitable 2K slot from the set of 2K slots available for 128B chunk type object caching. Step 512 allocates the selected 2K slot for storage of 128B chunk type objects and assigns the current 128B GUI object to the lowest slot (0). Otherwise, step 513 uses an available 128B slot to store the current GUI object. Step 514 computes the client object cache handle by forming the product of the 2K slot number and the value 16 to which the 128B slot number is added.

Figure 14:
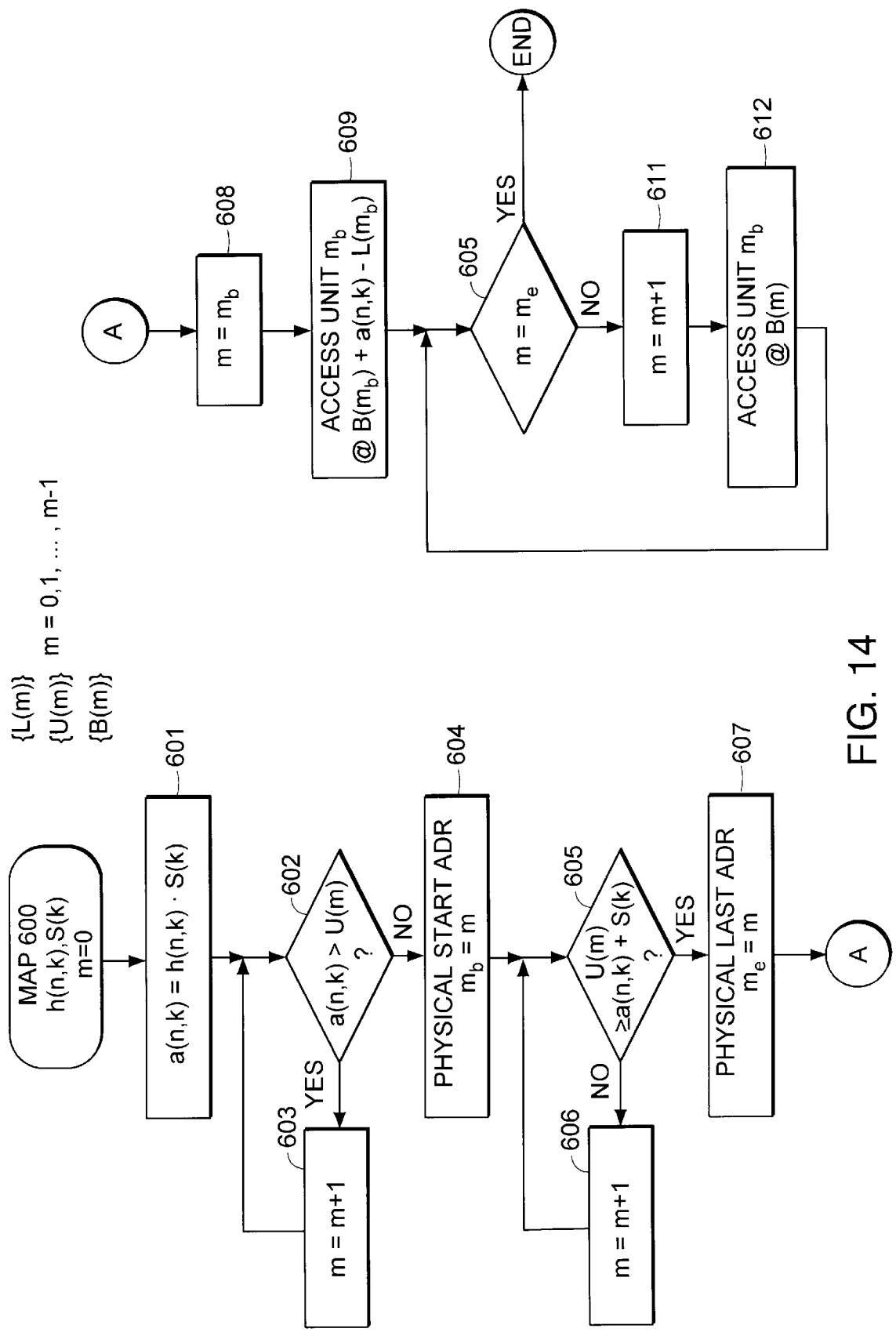
FIG. 14 is a flow diagram for mapping logical cache addresses into physical memory unit addresses.

FIG. 14 is a flow diagram for MAP 600, a method for mapping large cache 410 (FIG. 12) logical addresses to physical addresses for accessing physical memory spaces that correspond to the logical cache memory spaces. The method assumes that a given object is identified by its handle, $h(n,k)$, and size (type), $S(k)$; logical memory addresses begin at zero; logical memory is made up of M contiguous sections, each section having a lower boundary logical address, $L(m)$, and an upper boundary logical address $U(m)$, for $m=0, 1, \ldots, M-1$; and each contiguous memory section, m, corresponds to a section of physical memory of rank m and is located at the physical base address of $B(m)$.

Step 601 of FIG. 14 computes the starting logical address, $a(n,k)$ from the product $h(n,k) \cdot S(k)$ which is compared with the upper logical boundary address $U(m)$ in step 602. If $a(n,k)$ is greater than $U(m)$, index m is incremented in step 603 and step 602 is repeated. Otherwise, step 604 determines that the object starts in the $m^{th}$ physical memory unit. Step 605 and 606 are used to determine the index $m_e$ of the highest rank section in which storing of the object ends, Step 605 compares the quantity $\{a(n,k)+S(k)\}$ with the upper logical boundary address, $U(m)$. If $U(m)$ is smaller, step 606 increments index m and step 605 is repeated. Otherwise, step 607 sets the highest rank containing the object at $m=m_e$.

At this point, MAP 600 of FIG. 14 has provided the necessary information to map the logical object address to the physical address: rank index values $m_b$ and $m_e$ define the limits of the physical ranks m that are involved in the cache access ($m_b \leq m \leq m_e$). The remaining steps 608–612 are concerned with generating the required offset addresses for accessing the corresponding portions of physical memory. Step 608 sets index $m=m_b$. Step 609 accesses the physical memory section of rank $m_b$ memory unit beginning at address $B(m_b)+a(n,k)-L(m_b)$. Step 610 checks if all required ranks have been accessed and, if not, m is incremented in step 611 for accessing the rank m physical memory beginning at base address $B(m)$ in step 612. Test step 610 is then repeated.

Thus, the large cache has a variety of page sizes, one for each chunk size, all dynamically sharing the same logical cache unlike conventional prior-art cache structures that have only one page size.

The cache protocol also supports the caching of objects of size greater than 2KB by using the innovative concept of "chaining". Chaining is a method for creating a virtual cache chunk page (or superpage) by using a cache with smaller chunk pages. The superpage capacity is an integer number of times larger than the smaller page. For example, a cache with 2KB size chunk pages (maximal size pages) can be used to produce a cache for storing 10KB chunk type superpage by chaining five of the maximal (2KB size chunk) pages so that a single cache access is sufficient to access the lOKB virtual superpage.

Chaining is accomplished by identifying the first 2KB portion of the larger chunk type by using the client object cache handle and a chunk type of 2KB, as if it were a 2KB object. The remaining 2KB segments of the larger object are identified by using a "chain handle" for each additional 2KB segments of the larger object. The chain handle has the same format (and interpretation) as a client object cache handle used for the 2KB chunk types. The workstation cache manager is responsible for remembering all the chain handles associated with a given client object cache handle and chaining the segments in the order received. In this manner, the application server can efficiently initiate the retrieval of a larger workstation GUI object while minimizing bandwidth utilization of the common transport mechanism.

Figure 15:
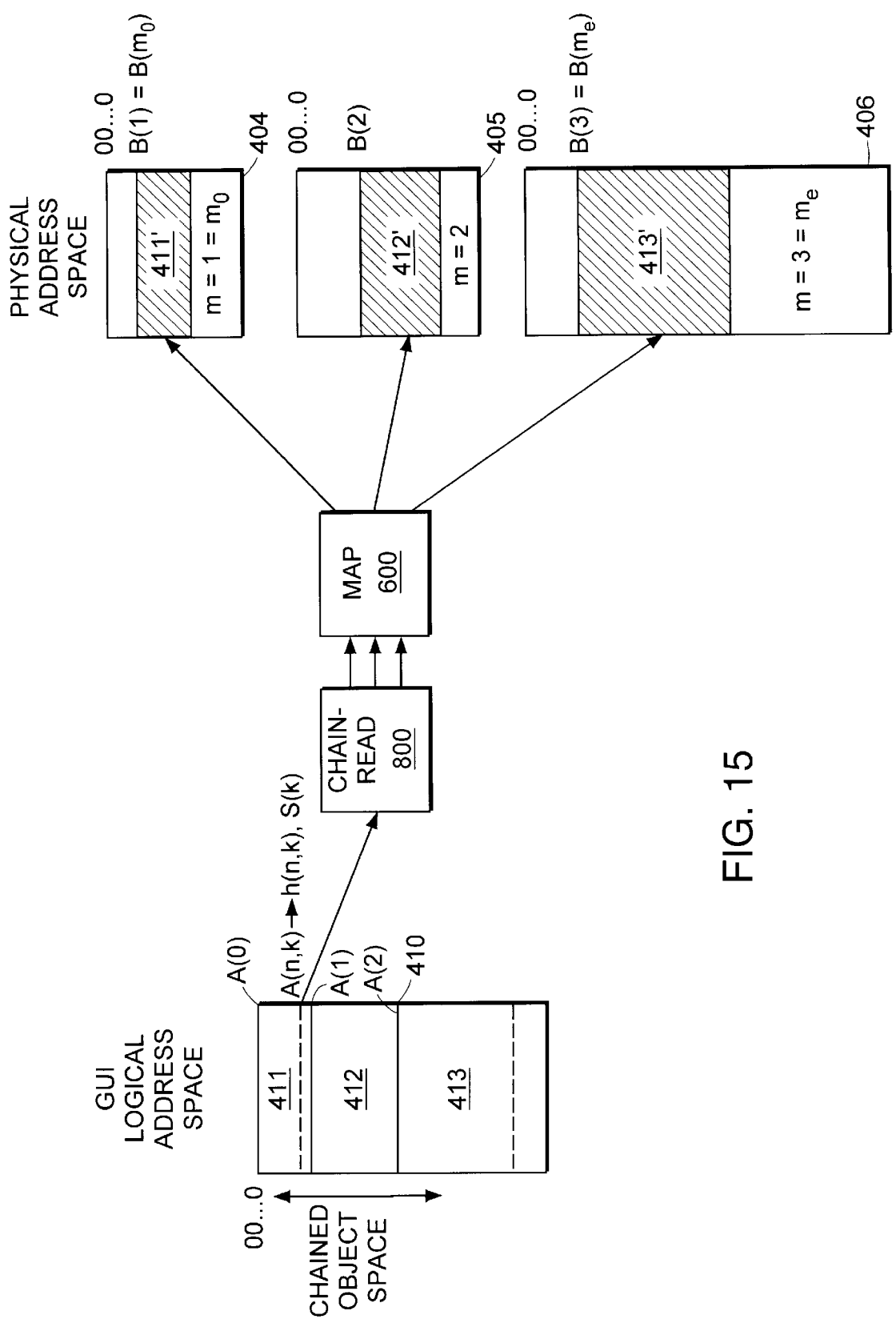
FIG. 15 shows how a GUI object logical address in logical cache is used to access a chained object in physical memories.

FIG. 15 shows how a GUI object logical address in logical cache 410 is used to access a chained object in physical memories 404, 405, and 406 (FIG. 8). In this example, a chained object in logical cache 410 is shown to span a chained object space from within logical cache segment 411, through segment 412, and into segment 413. The starting address of the chained object in segment 411 is sent to process CHAIN_READ 800 where a control storage is examined to determine if the object stored at the starting address is a chained object. If it is, the control storage yields a list of sequential chain handles that map to a list of logical cache addresses identifying the logical cache memory segments that contain the chained object. This information is passed on to process MAP 600 (previously described) that converts the logical addresses into a set of sequential addresses for accessing the relevant physical memory segments 411', 412', and 413'.

Figure 16:
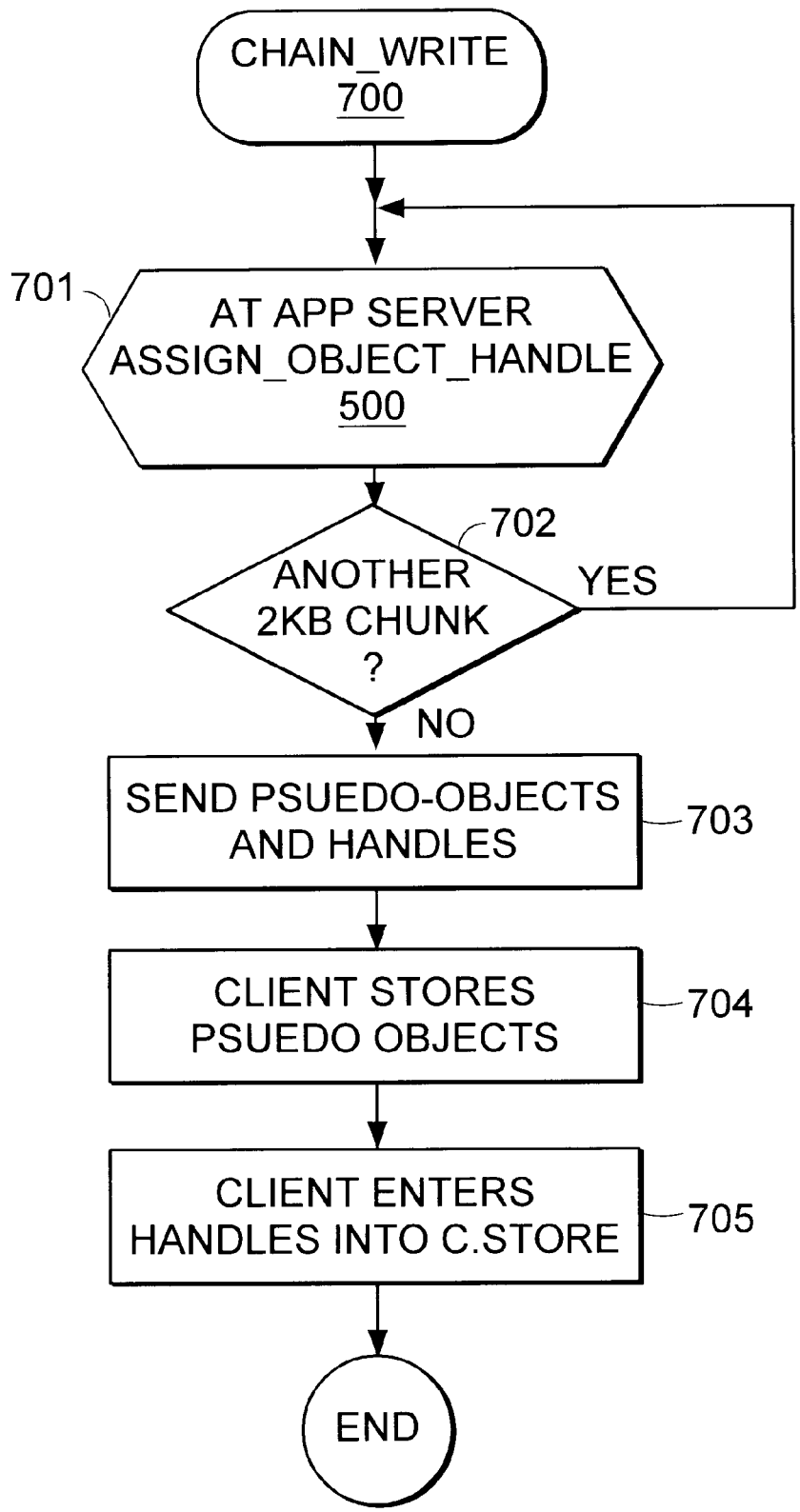
FIG. 16 is a flow diagram for writing GUI oversized chunk type objects into the client workstation GUI object cache using chaining.

FIG. 16 is a flow diagram of CHAIN_WRITE 700, the chaining procedure used by the system for writing a chained object into the client GUI object cache. It is assumed that a GUI object is to be sent for caching that is greater than 2KB, the maximal chunk type object that the cache can accommodate without chaining. In step 701 the application server assigns a client object cache handle to the GUI object that is to be sent for caching at the client workstation by using method 500 (ASSIGN_OBJECT_HANDLE) of FIG. 13. Method 500 is applied to each 2KB chunk of the GUI object by having step 702 check if there is another 2KB chunk to be chained. If so, the procedure returns to step 701. Otherwise, in step 703, the application server sends the chained oversized chunk type size and object to the client. The object is sent as a series of chained 2KB psuedo-chunk type objects, each with an associated chain handle. The client workstation recognizes that this is a chained object because of its superpage size and, in step 704 stores the psuedo objects according to the object handles associated with each psuedo-chunk type object. In step 705, the client workstation enters the chained oversized chunk type object size and series of 2KB psuedochunk type object handles in the cache control store so that when the oversized object is called from cache, the control store can recognize the oversized object's size and determine the location of each 2KB psuedo-chunk type object.

Figure 17:
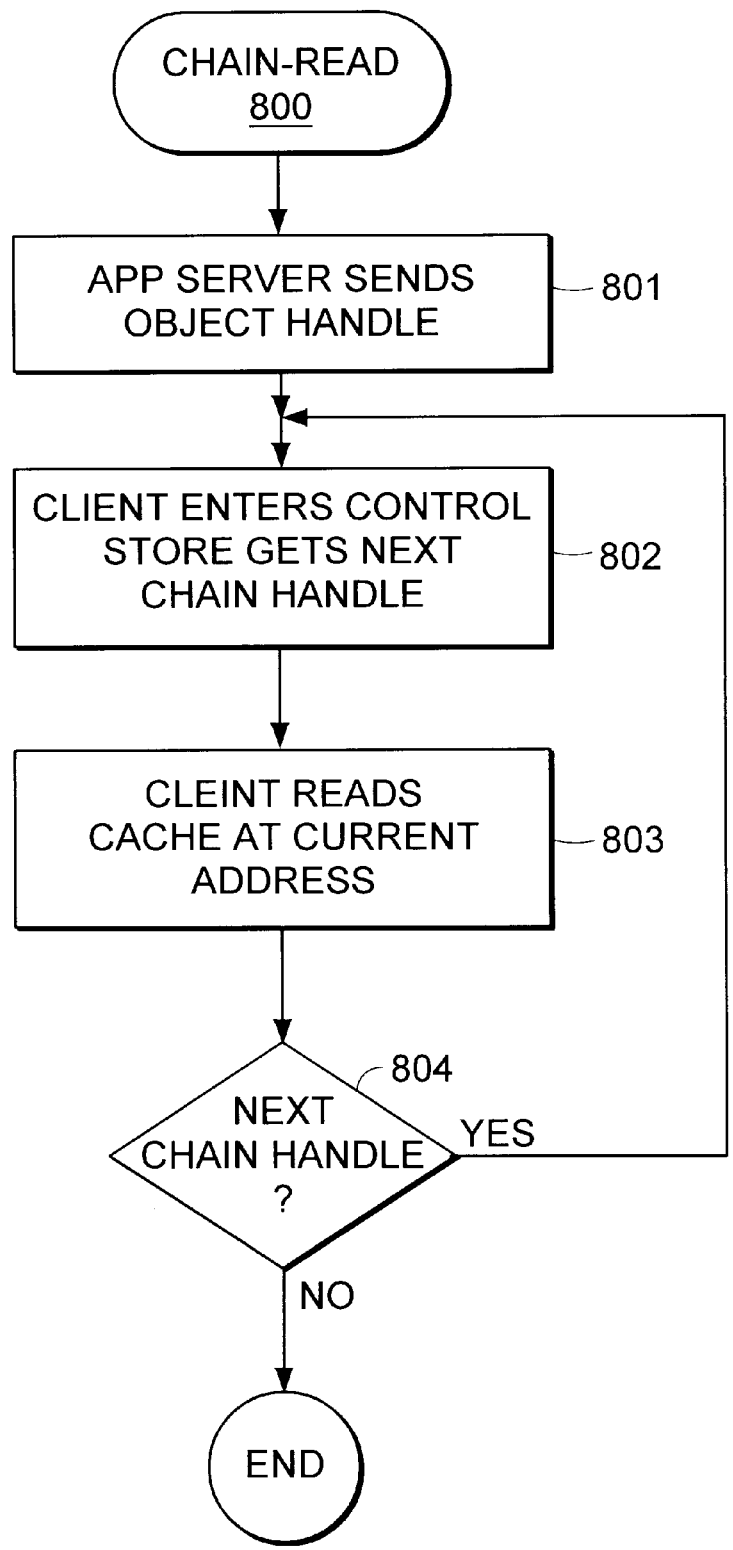
FIG. 17 is a flow diagram for reading oversized (chained) chunk type objects from the GUI object cache.

CHAIN_READ procedure 500 in FIG. 17 is a flow diagram that describes the method used to read chained oversized objects from the GUI object cache at the client workstation that have been cached in accordance with CHAIN_WRITE procedure 700 of FIG. 16. At step 801, the application server sends .a GUI object cache memory read for an oversized GUI object by simply sending the psuedo-chunk type object cache handle of the first 2KB psuedo-chunk type object (the client object cache handle). At step 802, the client enters the control store using the first 2KB psuedo-chunk object handle and gets the next 2KB psuedo chunk handle. Step 803 reads the current physical cache address computed from the current handle to obtain the object data. If the last psuedo-chunk type object has been read, the procedure ends. Otherwise the procedure returns to step 802.

Because of the method and apparatus described above, it is possible to efficiently and effectively cache as many different GUI object types and sizes in a given allocated size of workstation cache memory and thereby-improve the utilization of the available common transport bandwidth and the utilization of available memory resources. Both of these benefits lead to improved workstation performance for the user whose application is being served remotely.

It should also be noted that the techniques described above should prove useful for caching tasks other than graphical object caching whenever a variety of page sizes are to be accommodated within a cache memory or, whenever a variety of heterogenous physical memories are to be used for synthesizing a single logical cache. For example, a conventional prior-art fixed page cache when augmented with chaining can provide a cache with flexible page sizes.

As will be understood by those skilled in the art, many changes in the apparatus and methods described above may be made by the skilled practitioner without departing from the spirit and scope of the invention, which should be limited only as set forth in the claims that follow.

What is claimed is:

1. A method for dynamically reconfiguring a maximal size logical cache memory page to store a data object having a size different from the size of a data object previously stored by that logical cache memory page, the method comprising the steps of:

(a) at an application server
   (i) determining an associated size of a data object;
   (ii) transmitting the data object and the associated size of that data object to a client workstation;
(b) at the client workstation
   (i) receiving the data object and the associated size, wherein the associated size of the data object is smaller than a maximal size of a logical cache memory page;
   (ii) determining whether one of a plurality of logical cache memory pages is already configured to store data objects having the smaller size of the received data object;
   (iii) selecting, when no logical cache memory page is already configured to store data objects having the smaller size of the received data object, one of the logical cache memory pages which is the maximal size; and
   (iv) reconfiguring the selected maximal logical cache memory page into more than two equally-sized blocks for storing data objects having the smaller size of the received data object.

2. The method of claim 1 wherein step (b)(i) comprises assigning the data object a quantized size by rounding the size of the received data object up to a predetermined quanta.

3. The method of claim 2 wherein step (b)(iv) comprises subdividing the selected logical cache memory page into a plurality of equally-sized smaller pages, each equally-sized smaller page configured to store data objects of the quantized size and identified as storing data objects of the quantized size.

4. The method of claim 3, further comprising the step of mapping a logical address of the data object relative to a logical cache base memory address by:

mapping the logical address of the data object to a maximal size page index corresponding to the page location of the maximal size logical cache memory page relative to the logical cache memory base address; and mapping the logical address of the data object to a smaller page index that describes which of the plurality of smaller pages is being addressed within the maximal size page designated by the maximal size page index.

5. The method of claim 4 further comprising the step of generating the logical address of the data object by forming a product of the maximal size page index of the maximal size logical cache memory page that contains the data object and a value corresponding to the maximum number of objects of the smaller size that can be contained within the maximal size logical cache memory page, forming a sum of the product and the smaller page index, and multiplying the sum by the quantized size of the data object.

6. The method of claim 4, further comprising the step of providing the mapped logical address for the data object as a single handle.

7. The method of claim 1 wherein step (b)(i) comprises assigning the data object a quantized size selected from a set consisting of 128 bytes, 512 bytes, and 2 kilobytes, wherein the quantized size is assigned by rounding the size of the received data object up to the next predetermined size in the set.

8. The method of claim 1 wherein the data object received in step (b)(i) is a graphical user interface data object to be cached.

9. The method of claim 1 wherein step (b)(ii) comprises determining more than one of the plurality of logical cache memory pages that are configured to store data objects having the smaller size of the received data object.

10. The method of claim 1 wherein step (b)(iii) comprises selecting, when no logical cache memory page is already configured to store data objects having the smaller size of the received data object, one of the plurality of logical cache memory pages on a least recently used basis.

11. A method for dynamically reconfiguring a maximal size logical cache memory page to store a data object having a size different from the size of a data object previously stored by that logical cache memory page, the method comprising the steps of:
(a) at an application server
  (i) determining an associated size of a data object;
  (ii) transmitting the data object and the associated size of that data object to a client workstation;
(b) at the client workstation
  (i) receiving the data object and the associated size, wherein the associated size of the data object is greater than a maximal size of a logical cache memory page;
  (ii) subdividing the data object into first and second data chunks;
  (iii) assigning a first chunk index to the first data chunk and a second chunk index to the second data chunk, each index representing the maximal size logical cache memory page in which the respective data chunk is stored; and
  (iv) storing the second chunk index at a location in a control store that corresponds to the first chunk index for use in identifying the location of the second data chunk.

12. The method of claim 11 wherein step (b)(iv) comprises storing the second chunk index at the location in the control store that corresponds to the first chunk index for use in identifying the location of the first and second data chunks.

13. The method of claim 11 further comprising the steps of:
(b)(v) accessing the control store using a first page index corresponding to the first chunk index;
(b)(vi) recovering an index stored in the control store starting at a location corresponding to the first chunk index; and
(b)(vii) reading a maximal size logical cache memory page corresponding to the first chunk index.

14. A method for efficiently caching data objects in a logical cache memory including a plurality of maximal size pages beginning at a logical base memory address, the logical cache memory using prescribed portions of a plurality of heterogeneous physical memory units for storage of data, the method comprising:
(a) at an application server
  (i) determining an associated size of a data object;
  (ii) transmitting the data object and the associated size of that data object to a client workstation;
(b) at the client workstation
  (i) labeling each of the plurality of heterogeneous physical memory units with a unique rank index, the rank index indicative of the relative memory speed of the physical memory unit;
  (ii) allocating a portion of each physical memory unit for use by the logical cache memory;
  (iii) forming a continuous, addressable logical address space for the logical cache memory that encompasses the allocated portions of the physical memory units by ordering the allocated portions of the physical memory units based on the rank indices of the logical cache memory beginning at a logical cache memory base address, each maximal size page configured to store data objects of a maximal size and identified as storing data objects of a maximal size;
  (iv) receiving the data object and the associated size, wherein the associated size of the data object is smaller than the maximal size;
  (v) determining whether one of the plurality of logical cache memory pages is already configured to store data objects having the smaller size of the received data object;
  (vi) selecting, when no logical cache memory page is already configured to store data objects having the smaller size of the received data object, one of the logical cache memory pages which is the maximal size; and
  (vii) reconfiguring the selected maximal logical cache memory page into more than two equally-sized blocks for storing data objects having the smaller size of the received data object.

15. The method of claim 14 wherein step (b)(iv) comprises assigning the data object a quantized size by rounding the size of the received data object up to a predetermined quanta.

16. The method of claim 15 wherein step (b)(vii) comprises subdividing the selected cache page into a plurality of equally-sized smaller pages, each equally-sized smaller page configured to store data objects of the quantized size and identified as storing data objects of the quantized size.

17. The method of claim 16, further comprising the step of mapping a logical address of the data object relative to the logical cache base memory address by:
mapping the logical address of the data object to a maximal size page index corresponding to the page location of the maximal size logical cache memory page relative to the logical cache memory base address; and
mapping the logical address of the data object to a smaller page index that describes which of the plurality of smaller pages is being addressed within the maximal size page designated by the maximal size page index.

18. The method of claim 17 further comprising the step of generating the logical address for the data object by forming a product of the maximal size page index of the maximal size page that contains the data object and a value corresponding to the maximum number of objects of the smaller size that can be contained within the maximal size page, forming a sum of the product and the smaller page index, and multiplying the sum by the quantized size of the data object.

19. The method of claim 17, further comprising the step of providing the mapped logical address for the data object as a single handle.

20. The method of claim 14 wherein step (b)(iv) comprises assigning the data object a quantized size selected from a set consisting of 128 bytes, 512 bytes and 2 kilobytes; wherein the quantized size is assigned by rounding the size of the received data object up to the next predetermined size in the set.

21. The method of claim 14 wherein the data object received in step (b)(iv) is a graphical user interface data object to be cached.

22. The method of claim 14 wherein step (b)(v) comprises determining more than one of the plurality of logical cache memory pages that are configured to store data objects having the smaller size of the received data object.

23. The method of claim 14 wherein step (b)(vi) comprises selecting, when no logical cache memory page is already configured to store data objects having the smaller size of the received data object, one of the logical cache memory pages for reconfiguring on a least recently used basis.

* * * * *